(12) United States Patent
Cox et al.

(10) Patent No.: US 8,849,729 B2
(45) Date of Patent: *Sep. 30, 2014

(54) METHODS AND SYSTEMS FOR CONSTRUCTING BAYESIAN BELIEF NETWORKS

(75) Inventors: Zachary T. Cox, Barrie (CA); Jonathan Pfautz, Carlisle, MA (US); David Koelle, Arlington, MA (US); Geoffrey Catto, Cambridge, MA (US); Joseph Campolongo, Watertown, MA (US)

(73) Assignee: Charles River Analytics, Inc., Cambridge, MA (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/324,694

(22) Filed: Dec. 13, 2011

(65) Prior Publication Data

US 2012/0084239 A1   Apr. 5, 2012

Related U.S. Application Data

(63) Continuation of application No. 12/022,342, filed on Jan. 30, 2008, now Pat. No. 8,078,566.

(60) Provisional application No. 60/898,304, filed on Jan. 30, 2007, provisional application No. 60/928,906, filed on May 11, 2007.

(51) Int. Cl.
*G06F 15/18*     (2006.01)
*G06N 5/02*      (2006.01)
*G06N 5/04*      (2006.01)
*G06N 7/00*      (2006.01)

(52) U.S. Cl.
CPC ..................................... *G06N 7/005* (2013.01)
USPC ................................ 706/12; 706/52; 706/60

(58) Field of Classification Search
None
See application file for complete search history.

(56) References Cited

U.S. PATENT DOCUMENTS

| 5,802,256 | A  | * | 9/1998 | Heckerman et al. | 706/59 |
| 6,556,960 | B1 | * | 4/2003 | Bishop et al. | 703/2 |
| 2007/0005541 | A1 | * | 1/2007 | Sadeghi et al. | 706/45 |

OTHER PUBLICATIONS

Burges, "A Tutorial on Support Vector Machines for Pattern Recognition", Journal Data Mining and Knowledge Discovery archive, vol. 2 Issue 2, Jun. 1998, pp. 121-167.*
Madsen, Jensen, Kjaerulff and Lang, "The Hugin Tool for Probabilistic Graphical Models", International Journal on Artificial Intelligence Tools, vol. 14, No. 3, 2005, pp. 507-543.*
Lucas, "Certainty-factor-line structures in Bayesian belief networks", Knowledge-Based Systems, vol. 14, 2001, pp. 327-335.*
Falzon et al., The Centre of Gravity Network Effects Tool: Probabilistic Modelling for Operational Planning, DSTO Information Sciences Laboratory, DSTO-TR-1604, pp. 1-44 (2004).

* cited by examiner

*Primary Examiner* — Kakali Chaki
*Assistant Examiner* — Walter Hanchak
(74) *Attorney, Agent, or Firm* — McDermott Will & Emery LLP

(57) ABSTRACT

Methods and systems are described for simplifying a causal influence model that describes influence of parent nodes $X_i$ (i=1, ..., n) on possible states of the child node Y. The child node Y and each one of the parent nodes $X_i$ (i=1, ..., n) are assumed to be either a discrete Boolean node having states true and false, a discrete Ordinal node having a plurality of ordered states; and a Categorical node having a plurality of unordered states. The influence of each parent node $X_i$ on the child node Y is assumed to be a promoting influence and an inhibiting influence. User interfaces are described that incorporate these specific node types.

2 Claims, 29 Drawing Sheets

| CLOUDY | RAIN | |
|---|---|---|
| | TRUE | FALSE |
| TRUE | 0.600 | -0.600 |
| FALSE | -0.600 | 0.600 |

FIG. 2C

| | PARENT | CHILD | |
|---|---|---|---|
| | CLOUDY | RAIN | |
| | | TRUE | FALSE |
| 1 | TRUE | 0.800 | 0.200 |
| 2 | FALSE | 0.200 | 0.800 |

FIG. 2D

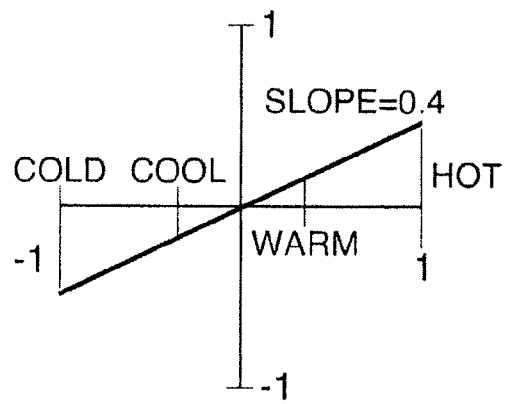
FIG. 3A
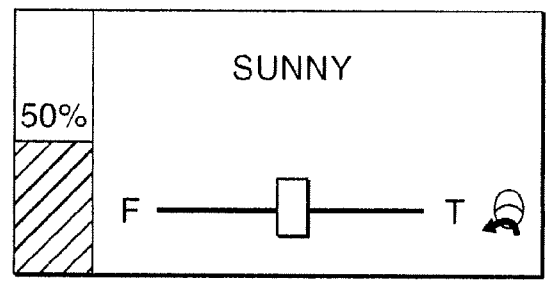
FIG. 3B
| CLOUDY | RAIN | |
|---|---|---|
| | TRUE | FALSE |
| TRUE | 0.600 | -0.600 |
| FALSE | -0.600 | 0.600 |
FIG. 3C

| | PARENT | CHILD | | | |
|---|---|---|---|---|---|
| | SUNNY | ASPHALT TEMPERATURE | | | |
| | | HOT | WARM | COOL | COLD |
| 1 | TRUE | 0.450 | 0.317 | 0.183 | 0.050 |
| 2 | FALSE | 0.050 | 0.183 | 0.317 | 0.450 |

|       | Y     |        |       |
| $X_i$ | $y^1$ | $y^0$ ... | $y^m$ |
|-------|-------|--------|-------|
| $x_i^1$ | $h_i^1$ | $-h_i^2$ | $h_i^m$ |
| $x_i^0$ | $-h_i^1$ | $h_i^2$ | $-h_i^m$ |
FIG. 4C
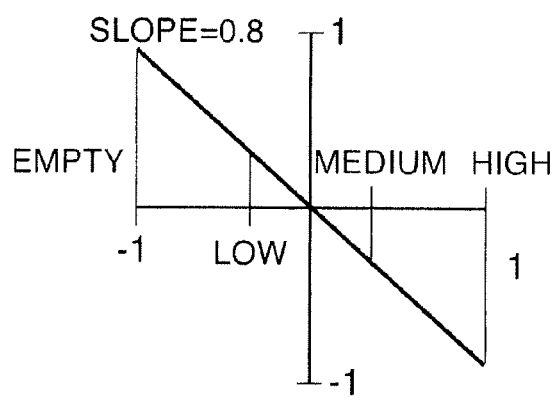
FIG. 5A
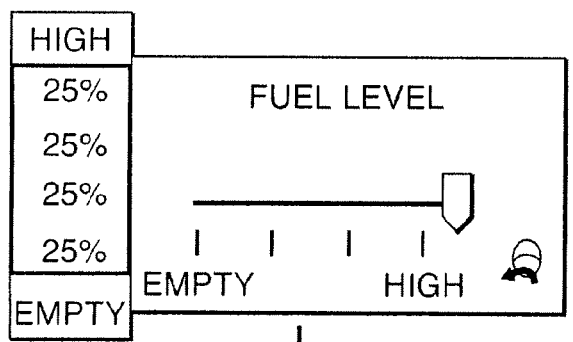
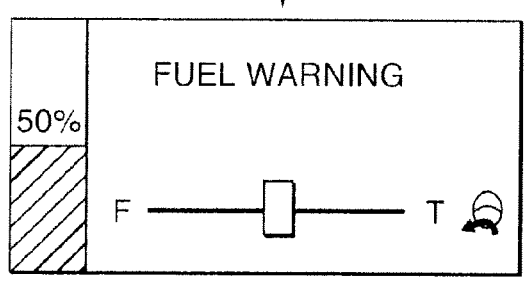
FIG. 5B

| FUEL LEVEL | FUEL WARNING | |
|---|---|---|
| | TRUE | FALSE |
| HIGH | -0.800 | 0.800 |
| MEDIUM | -0.267 | 0.267 |
| LOW | 0.267 | -0.267 |
| EMPTY | 0.800 | -0.800 |

FIG. 5C

| | PARENT | CHILD | |
|---|---|---|---|
| | FUEL LEVEL | FUEL WARNING | |
| | | TRUE | FALSE |
| 1 | HIGH | 0.100 | 0.900 |
| 2 | MEDIUM | 0.366 | 0.634 |
| 3 | LOW | 0.634 | 0.366 |
| 4 | EMPTY | 0.900 | 0.100 |

FIG. 5D

| VEHICLE W... | FUEL EFFICIENCY | | | |
|---|---|---|---|---|
| | 40 MPG | 30 MPG | 20 MPG | 10 MPG |
| 4000 LBS | -0.400 | -0.200 | 0.200 | 0.400 |
| 3000 LBS | -0.400 | 0.000 | 0.400 | 0.000 |
| 2000 LBS | 0.000 | 0.400 | 0.000 | -0.400 |
| 1000 LBS | 0.400 | 0.200 | -0.200 | -0.400 |

FIG. 6D

| | PARENT | CHILD | | | |
|---|---|---|---|---|---|
| | VEHICLE ... | FUEL EFFICIENCY | | | |
| | | 40 MPG | 30 MPG | 20 MPG | 10 MPG |
| 1 | 4000 LBS | 0.050 | 0.150 | 0.350 | 0.450 |
| 2 | 3000 LBS | 0.150 | 0.250 | 0.350 | 0.250 |
| 3 | 2000 LBS | 0.250 | 0.350 | 0.250 | 0.150 |
| 4 | 1000 LBS | 0.450 | 0.350 | 0.150 | 0.050 |

FIG. 6E

| $X_i$ | $y^1$ | $y^0$ | ... | $y^m$ |
|---|---|---|---|---|
| $x_i^1$ | $a_1 h_i^1$ | $a_1 h_i^2$ | | $a_1 h_i^m$ |
| $x_i^2$ | $a_2 h_i^1$ | $a_2 h_i^2$ | | $a_2 h_i^m$ |
| ⋮ | ⋮ | ⋮ | | ⋮ |
| $x_i^{m_i}$ | $a_{m_i} h_i^1$ | $a_{m_i} h_i^2$ | | $a_{m_i} h_i^m$ |

Y (above the $y$ columns)

$$\begin{array}{c|ccc}
 & \multicolumn{3}{c}{Y} \\
X_1 & y^1 & y^2 \cdots & y^3 \\
\hline
x_i^1 & h_{i11} & h_{i12} & h_{i1m} \\
x_i^2 & h_{i21} & h_{i22} & h_{i2m} \\
\vdots & & & \\
x_i^{m_i} & h_{im_i 1} & h_{im_i 2} & h_{im_i m}
\end{array}$$
FIG. 10C
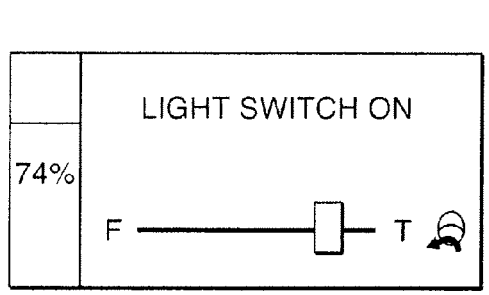
FIG. 11B
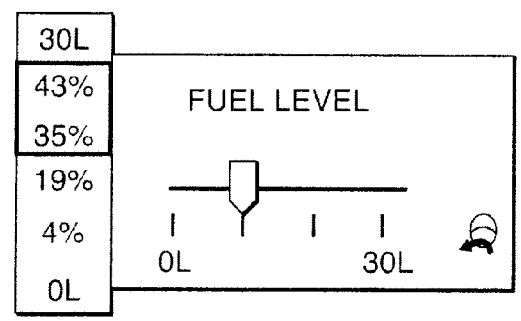
FIG. 11C

METHODS AND SYSTEMS FOR CONSTRUCTING BAYESIAN BELIEF NETWORKS

CROSS-REFERENCE TO RELATED APPLICATIONS

This present application is a continuation of U.S. application Ser. No. 12/022,342, filed Jan. 30, 2008, which claims the benefit of priority under 35 U.S.C. §119(e) from U.S. Provisional Patent Application Ser. No. 60/898,304, filed Jan. 30, 2007, entitled "Conditional Probability Tables For Bayesian Belief Networks"; and U.S. Provisional Patent Application Ser. No. 60/928,906, filed May 11, 2007, entitled "Methods and Systems for Constructing Bayesian Belief Networks," the disclosure of which are incorporated by reference herein.

The present application also claims priority under 35 U.S.C. §120 to co-pending U.S. application Ser. No. 11/656,085 (the "parent '085 application," entitled "Conditional Probability Tables For Bayesian Belief Networks"), filed on Jan. 22, 2007, which is incorporated herein by reference in its entirety.

FIELD OF THE DISCLOSURE

The present disclosure relates to Bayesian belief networks.

BACKGROUND

Bayesian belief networks (BBNs) are probabilistic models used to reason under uncertainty. Bayesian belief networks have been successfully used to reason about a wide variety of phenomena, including but not limited to computer vision, social networks, human cognition, and disease detection.

The use of BBNs to provide some computational reasoning capability requires the specification of a priori probability distributions for each node in the network. In applications where there is sufficient prior data, generating these probability distributions can be straightforward. In other applications, various learning algorithms can be used to start from initial distributions and adapt them as a function of incoming data. In many applications, however, BBNs are used to represent expert knowledge or reasoning. In these cases, the construction of a priori probability distributions is substantially more challenging.

A Bayesian belief network includes nodes that are connected by directed edges or links. Each node represents a particular random variable having a certain number of states or values. Each link is directed from a parent node to a child node and shows the causal influence of the parent node on the child node. In particular, the link from a parent node to a child node represents a causal relationship between an event that occurred earlier, as indicated by the state of the parent node, and an event that occurred later, as indicated by the state of the child node.

Every child node in a belief network has an associated conditional probability distribution that describes the causal influence of its parents. The conditional probability distribution of a child node specifies one probability distribution for each combination of values of the parents of the child node.

When all the nodes of a belief network are discrete, each node has a conditional probability table (CPT) associated with it that quantifies the causal probabilistic relationship between that node and its parent nodes, i.e. the a prior probabilities. Using CPTs, and possibly evidence, beliefs can be computed for the nodes of the belief network. Beliefs represent conclusions that can be drawn about the present, using information about the past stored in the CPTs, and using information about the present stored in evidence, if any. A belief for a node X represents a conditional probability distribution of the node X, given all available evidence for that node.

To compute beliefs using a belief network that has discrete nodes, users of the belief network typically enter the CPT values for each node, based on the number of states of that node and on the number of parents that the node has. Such a process can become unwieldy, because the number of CPT values that must be specified for a node increases exponentially with the number of states and parents of the node. The CPT specifies one probability distribution over the states of the child node for each combination of states of its parent nodes. The number of these distributions in the child node's CPT grows exponentially in the number of parents and the number of states per parent and can quickly exceed a reasonable number. The potential for this exponential explosion can reduce the applicability of BBNs to many problem domains. This exponential explosion, combined with the underlying sophistication of the representation, presents a challenge.

A canonical model makes a specific assumption about the type of relationship between a node and its parents. This assumption results in many fewer parameters being needed to specify an entire CPT. There are many types of canonical models used in practice and each assumes a different relationship.

In the parent '085 application, one type of canonical model called the Causal Influence Model (CIM) was disclosed. The CIM uses a linear function to combine parent influences, resulting in belief values that are perceived as more intuitive by users, regardless of the input parameters. The CIM assumes that each node is discrete and has an arbitrary number of states with arbitrary meaning. Each node has a baseline probability distribution, independent of any parent effects. Each parent independently influences these baseline probabilities to be more or less likely.

The Causal Influence Model (CIM) provides an intuitive way to reduce the number of parameters required for a Conditional Probability Table (CPT) from an exponential function of the number of parents to a linear function of the number of parents. However, for each parent $X_i$ the user must still specify a matrix of parameters, called the causal influence matrix. The matrix has a size $m_i \times m$, where $m_i$ is the number of states of parent $X_i$ and m is the number of states of child Y. For each parent, the user must specify a number of influences equal to the product of the number of parent states and child states for the CIM. While this is certainly better than the CPT, it can still result in too many parameters for a user to specify.

Methods and systems that simplify and reduce the number of parameters needed to specify the causal influence matrix are therefore desirable.

SUMMARY

Methods and systems are described for making a probabilistic inference based on a belief network including a child node Y and one or more parent nodes $X_i$ (i=1, ..., n) for the child node Y. An apparatus includes a processing system configured to receive as input one or more parameters of a causal influence model that describes the influence of the parent nodes $X_i$ on the possible states of the child node Y, and convert the parameters of the causal influence model into entries of a conditional probability table, using a creation function. The child node Y and each one of the parent nodes $X_i$ (i=1, ..., n) is either a discrete Boolean node having states true and false, or a discrete Ordinal node having a plurality of ordered states, or a discrete Categorical node having a plurality of unordered states. The influence of each parent node $X_i$ on the child node Y is either a promoting influence or an inhibiting influence.

BRIEF DESCRIPTION OF DRAWINGS

FIG. 2C illustrates the resulting causal influence matrix for the Cloudy-Rain relationship, when this relationship is quantified with a parameter of 0.6.

FIG. 2D illustrates the promoting effect of Cloudy on Rain in Rain's CPT.

FIG. 3A illustrates a causal influence matrix for a Boolean parent and an Ordinal child.

FIG. 3B illustrates an example of a Boolean parent, Sunny, and an Ordinal child, Asphalt Temperature.

FIG. 3C illustrates the resulting causal influence matrix for Sunny and Asphalt Temperature.

FIG. 4C illustrates a causal influence matrix for a Boolean parent and a Categorical child.

FIG. 5A illustrates a causal influence matrix for an Ordinal parent and a Boolean child, where the simplifying assumption is made that each column is a linear function of $h_i$.

FIG. 5B illustrates an example of an Ordinal parent, Fuel Level, and a Boolean child, Fuel Warning.

FIG. 5C illustrates the resulting causal influence matrix for the Ordinal parent and Boolean child, for $h_i$ −0.8.

FIG. 5D illustrates the inhibiting effect of Fuel Level on Fuel Warning in Fuel Warning's CPT.

FIG. 6D illustrates the resulting causal influence matrix for the Ordinal parent and Ordinal child, for $h_i$ −0.4.

FIG. 6E illustrates the inhibiting effect of Vehicle Weight on Fuel Efficiency in Fuel Warning's CPT.

FIG. 10C illustrates a causal influence matrix for a Categorical parent and a Categorical child.

FIG. 11B illustrates an example of a Boolean user interface with belief for true as vertical bar, evidence as horizontal slider, and no baseline display/input.

FIG. 11C illustrates an example of an Ordinal user interface with beliefs as vertical bar, evidence as horizontal slider, and no baseline display/input.

DETAILED DESCRIPTION

In the present disclosure, methods and systems are described that further simplify the CIM by making assumptions about the types of the parent and child nodes and the type of influence that the parent has on the child.

Conditional Probability Table (CPT) and the Causal Influence Model (CIM)

Figure 1A:
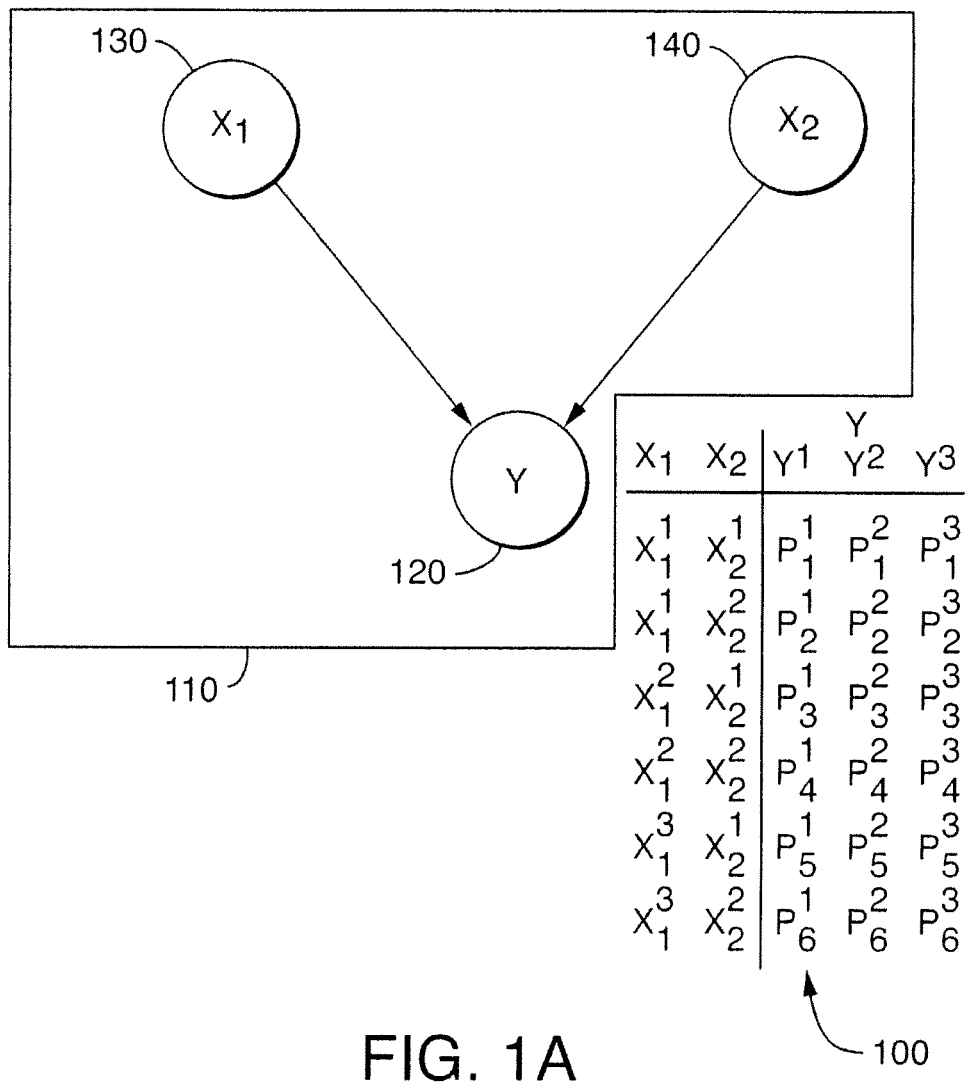
FIG. 1A illustrates one example of a CPT (Conditional Probability Table) for a BBN (Bayesian belief network) that includes one child Y having three states, a first parent $X_1$ having three states, and a second parent $X_2$ having two states.

CPTs and the CIM have been described in the parent '085 application, and the description is repeated below. FIG. 1A illustrates one example of a CPT (Conditional Probability Table) 100 for a simple exemplary belief network 110. The belief network 110 includes one child node Y, indicated with reference number 120, and two parent nodes $X_1$ and $X_2$, respectively indicated with reference numbers 130 and 140. In the illustrated example, the child node Y has three states, the first parent $X_1$ has three states, and the second parent $X_2$ has two states.

In general, a child node Y in a belief network has n parents $X_1, X_2, \ldots, X_n$, which may be denoted as $X=(X_1, X_2, \ldots, X_n)$ using a vectorial notation. The child Y has m states $y^1, y^2, \ldots, y^m$. Each one of the parents $X_i$ has $m_i$ states $x_i^1, x_i^2, \ldots, x_i^{m_i}$.

The CPT of a child node Y can be represented mathematically as P(Y|X), and is made up of individual probabilities $P(y^k|x_l)$. Here, $y^k$ denotes the k-th state of child Y, and $x_l$ denotes the l-th configuration of the n parents X. The notation $x_i^j \sim x_l$ indicates that the parent $X_i$ takes on a state $x_i^j$ in $x_l$. $P(y^k|x_l)$ denotes the probability that the child Y be in the state $y^k$ given that Y's parents are in the configuration $x_l$. The probability $P(y^k|x_l)$ must be between 0 and 1: $P(y^k|x_l) \in [0,1]$. The sum over all possible m states of the probabilities $P(y^k|x_l)$ must be 1:

$$\sum_{k=1}^{m} P(y^k | x_l) = 1.$$

A summary of the variables and indices used to describe the CPT of the child node Y is provided below:
Y is the child node whose CPT is being generate;
$y^k$ is the k-th state of Y;
$X_i$ is the i-th parent of Y;
$x_i^j$ is the j-th state of parent $X_i$;
n is the number of parents of Y;
m is the number of states of Y;
$m_i$ is the number of states of $X_i$;|
r is the number of rows in the child Y's CPT;
$p_l^k$ is the CPT entry in row l for child state k;
i is the parent index, $1 \leq i \leq n$;
j is the parent state index, $1 \leq j \leq m_i$;
k is the child state index, $1 \leq k \leq m$;
l is the CPT row index, $1 \leq l \leq r$.
The CPT contains a total of $$m \prod_{i=1}^{n} m_i$$

individual probabilities $P(y^k|x_l)$. In other words, the number of entries of the CPT increases exponentially with the number of parents. Generating a CPT thus requires a large number of parameters that may be time consuming for a human user to specify and for the processing system to handle.

Figure 1B:
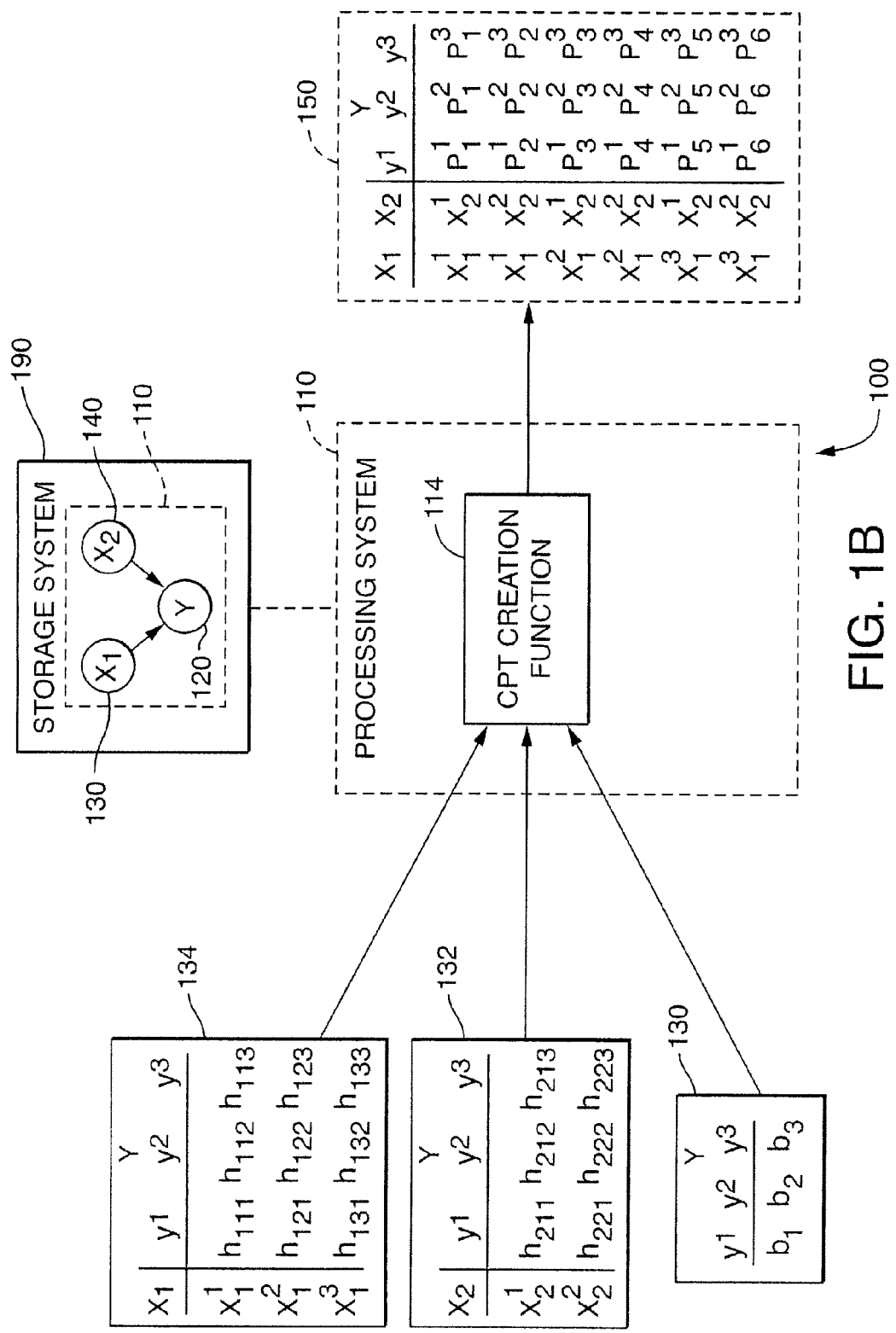
FIG. 1B is a functional diagram of an apparatus that creates a CPT from a smaller number of parameters, using a CPT creation function.

FIG. 1B is a functional diagram of an apparatus 100 that computes probabilities of interest, such as beliefs, for a belief network, using a CPT creation function. The apparatus 100 includes a processing system 110, and a storage system 120. The processing system 110 is configured to receive, as input, causal influence model (CIM) parameters that are denoted in FIG. 1B as 130, 132, and 134. As explained earlier, a causal influence model is a model that describes the influence of the parent nodes of a child node on the possible states or values the child node may take. The processing system 110 uses a CPT creation function 114 to convert these CIM parameters into entries of a CPT (conditional probability table) 150, and generates as output the CPT 150 for the child node Y.

The storage system 120 is a data storage medium, including but not limited to electromagnetic and optical data storage mediums, which stores data structures that include the belief network. The exemplary belief network includes one child node Y that has three states ($y^1$, $y^2$, and $y^3$), and two parent nodes $X_1$ and $X_2$, where $X_1$ has 3 states ($x_1^1$, $x_1^2$, $x_1^3$) and $X_2$ has two states ($x_2^1$, $x_2^2$).

The Causal Influence Model (CIM) provides an intuitive way to reduce the number of parameters required for a Conditional Probability Table (CPT) from exponential in the number of parents to linear in the number of parents. However, for each parent $X_i$ the user must still specify a matrix of parameters of size $m_i \times m$, where $m_i$ is the number of states of parent $X_i$ and m is the number of states of child Y.

Figure 1C:
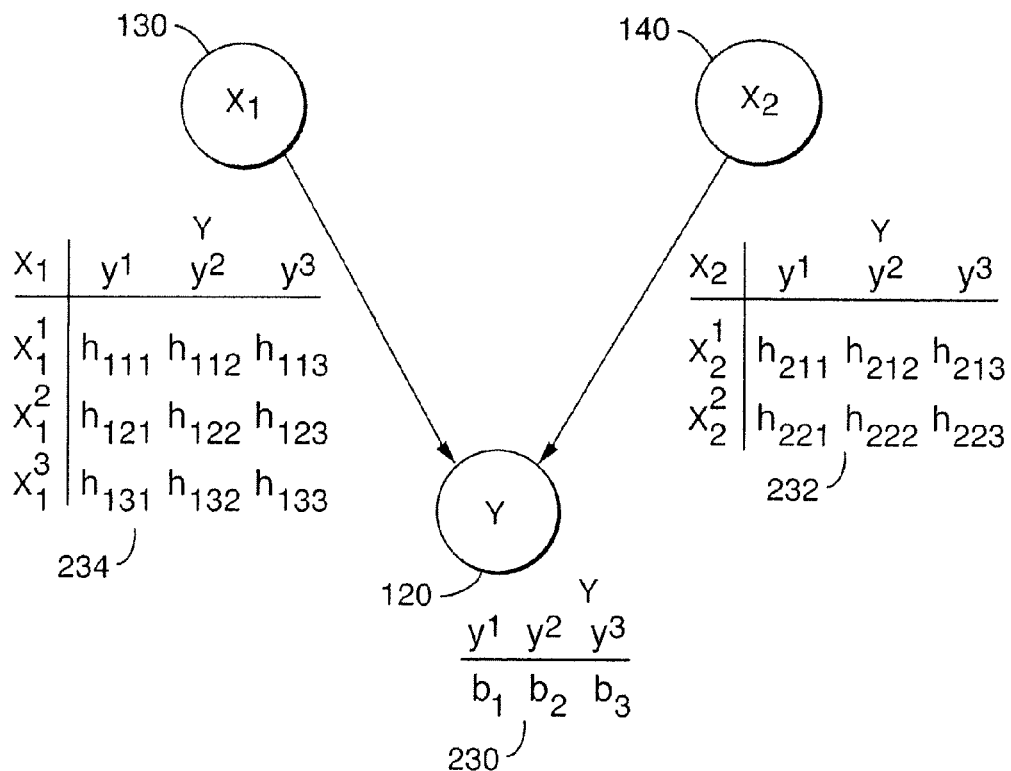
FIG. 1C illustrates CIM (Causal Influence Model) parameters for the BBN shown in FIG. 1A.

An example of such a casual influence matrix is shown in FIG. 1C, which illustrate the CIM parameters for the belief network illustrated in FIG. 1A. In the illustrated embodiment, two types of CIM parameters are shown: 1) baseline probabilities $b_k$, and 2) causal influences $h_{ijk}$. A baseline probability $b_k$ represents the probability that the child node Y is in the state $y^k$, in the absence of any parent influence whatsoever. The probability $b_k$ must be less than or equal to 1, and greater than or equal to 0, i.e. $b_k \in [0,1]$. Also, the sum of $b_k$ over all possible states k of the child node Y must be 1:

$$\sum_{k=1}^{m} b_k = 1 \qquad (1)$$

The baseline probabilities $b_k$ (k=1, ... m) may thus be represented as a vector of size 1×m. In other words, the number of baseline probabilities is m, independent of the number of parents of the child node Y.

The causal influences $h_{ijk}$ describe the change in the probability that child Y is in state $y^k$, when the i-th parent $X_i$ is in the state $x_i^j$. The causal influences $h_{ijk}$ are greater than or equal to −1, and less than or equal to 1, since the most a causal influence $h_{ijk}$ can change a probability is to change a probability of 1 to 0, or change a probability of 0 to 1. In other words, $h_{ijk} \in [-1,1]$.

When $h_{ijk} > 0$, an increase occurs in the probability of $y^k$, because of the influence of the parents $X_i$. When $h_{ijk} < 0$, a decrease occurs in the probability of $y^k$, because of the influence of the parents $X_i$. When hijk=0, no change occurs in the probability of $y^k$. The larger the magnitude of $h_{ijk}$, the larger the increase/decrease in the probability of $y_k$. Also, the sum of the causal influences $h_{ijk}$ over all possible states m of the child node Y is zero:

$$\sum_{k=1}^{m} h_{ijk} = 0 \qquad (2)$$

The causal influences $h_{ijk}$ may be represented by n matrices of size $m_i \times m$, one for each parent $X_1$. The total number of causal influences is linear in the number of parents, and is given by causal influences.

In the present disclosure, the CPT creation function 214 uses an overall parent influence function $V_{lk}$, which describes an overall influence of all the parents on the probability of the child node Y being in a state $y^k$, when the parents are in a configuration $x_l$. The overall parent influence function $V_{lk}$ is a function of the causal influences $h_{ijk}$:

$$V_{lk} = f(h_{1jk}, h_{2jk}, \ldots, h_{njk})_{x_i^j \sim x_l} \quad (3)$$

The overall parent influence function $V_{lk}$ is between $-1$ and $1$, $V_{lk} \in (-1,1)$. The sum of $V_{lk}$ over all possible states $k=1, \ldots, m$ of the child Y is zero:

$$\sum_{k=1}^{m} V_{lk} = 0 \quad (4)$$

One simple example of the overall parent influence function $V_{lk}$ is given by a mean of all causal influences:

$$V_{lk} = \frac{1}{n} \sum_{\substack{i=1 \\ x_i^j \sim x_l}}^{n} h_{ijk} \quad (5)$$

An abstract form of a CPT creation function may be described conceptually as follows:

$$P(y^k \mid x_l) = \begin{cases} b_k + f(V_{lk}) & V_{lk} \geq 0 \\ b_k - f(V_{lk}) & V_{lk} < 0 \end{cases} \quad (6)$$

The above means that for a state $y^k$, if $V_{lk}$ is positive then the baseline $b^k$ is increased by some function of $V_{lk}$, whereas if $V_{lk}$ is negative then the baseline $b^k$ is decreased by some function of $V_{lk}$.

In one embodiment of the present disclosure, an actual CPT creation function may be given as follows:

$$P(y^k \mid x_l) = \begin{cases} b_k + sb^+(V_{lk}) & V_{lk} \geq 0 \\ b_k - sb^-(V_{lk}) & V_{lk} < 0 \end{cases} \quad (7)$$

In the equation above, $b^+$ denotes the maximum amount that the baseline probabilities can be increased, and is given by the following equation:

$$b^+ = 1 - \sum_{\substack{k=1 \\ v_{lk} \geq 0}}^{m} b_k \quad (8)$$

$b^-$ denotes the maximum amount that the baseline probabilities can be decreased, and is given by the following equation:

$$b^- = \sum_{\substack{k=1 \\ v_{lk} < 0}}^{m} b_k \quad (9)$$

$s_k$ denotes a scale factor, and is given by the following equation:

$$s_k = \begin{cases} \dfrac{1 - b_k}{V_{lk}} & V_{lk} \geq 0 \\ \dfrac{|b^- V_{lk}|}{} & V_{lk} < 0 \end{cases} \quad (10)$$

The scale factor $s_k$ is used to keep each individual probability $P(y^k|x_l) \in [0.1]$.

The scale factor s is a scale factor to keep all the probabilities $P(y^k|x_l)$ less than or equal to one and greater than or equal to zero, and is given by:

$$s = \min_{k}(\min(s_k), 1) \quad (11)$$

Using the scale factor s ensures that all probabilities satisfy the following equation:

$$P(y^k|x_l) \in [0,1] \quad 1 \leq k \leq m \quad (12)$$

Using the actual CPT creation function provided in equation (7) above, the following is guaranteed:

$$P(y^k \mid x_l) \in [0, 1] \text{ and}$$

$$\sum_{k=1}^{m} P(y^k \mid x_l) = 1.$$

An exemplary algorithm for the CPT creation function is provided below. As a preliminary matter, the indices l and k for the rows of the CPT creation function and for each child state k satisfy the following relationships:

$1 \leq l \leq r$, for each row l in the CPT creation function; and
$1 \leq k \leq m$, for each child state k.

With the above constraints, the overall parent function $V_{lk}$ is calculated using equation (3). The baseline probabilities $b^+$ and $b^-$ is be calculated, using equations (8) and (9). The scale factor s is calculated using equation (11).

The CPT entry for each row l and child state k can then be calculated, using equation (7).

The CIM, described above, provides a way for the user to specify parameters for each parent independently and a sound method for combining them together to produce a CPT. For these reasons it can serve as a good base model for further simplifications by making assumptions about how each parent individually influences the child and parameterizing these assumptions.

In the present disclosure, the number of parameters needed to specify the causal influence matrix are simplified and reduced, by classifying each node in the BBN as one of Boolean, Ordinal, and Categorical states, and by making assumptions about each of the nine possible types of relationships between them. By making assumptions about how each parent individually influences the child and parameterizing these assumptions, a two-layer canonical model results: the simplified parameters are converted to CIM parameters, which are in turn converted into a CPT.

$$m \sum_{i=11}^{n} m_i$$

Figures 1D, 1E:
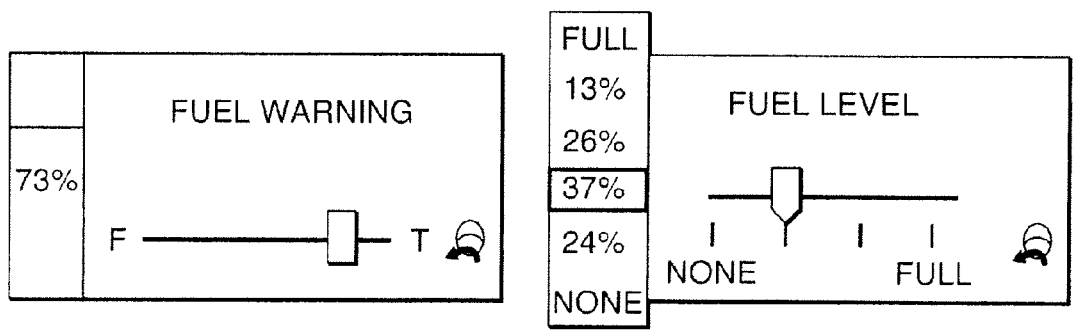
FIG. 1D illustrates a prototype Boolean node.
FIG. 1E illustrates a prototype Ordinal node.

Boolean nodes are discrete nodes that have states true and false. FIG. 1D illustrates an exemplary Boolean node.

Ordinal nodes are discrete nodes that have some number of ordered states from off or low to high. FIG. 1E illustrates an exemplary Ordinal node.

Figure 1F:
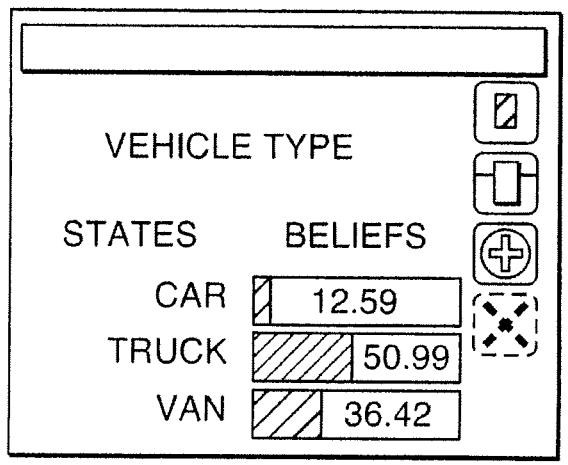
FIG. 1F illustrates a prototype Categorical node.

Categorical nodes are discrete nodes that have some number of unordered states. FIG. 1F illustrates a prototype Categorical node.

There are nine types of edges connecting these three node types. By assuming that each parent has either a promoting or inhibiting influence on the child, the CIM parameters may be reduced to a single parameter for the four types of edges connecting Boolean and Ordinal nodes, and to a single parameter for each state of the Categorical node in the four types of edges connecting a Categorical node to either a Boolean or Ordinal node.

These simplified parameters typically quantify either a promoting or inhibiting effect of a parent on a child. A parent promotes a child when a true or higher level of the parent increases the probability of the child being true or taking on a high level and vice-versa. A parent inhibits a child when a false or lower level of the parent increases the probability of the child being true or taking on a high level and vice-versa.

These promoting/inhibiting parameters are in the range [−1, 1]. A positive parameter represents a promoting relationship while a negative parameter represents an inhibiting relationship. A higher magnitude of the parameter represents a stronger promoting/inhibiting relationship (zero means the parent has no effect on the child).

Each possible combination of the three node types for the parent node and the child node will be discussed below.

Boolean Parent and Boolean Child

The CIM for a Boolean-Boolean edge has four parameters. To reduce the CIM to a single parameter, it is noted that the parameters for each parent state must sum to zero. It is also assumed that when the parent is false it has the equal and opposite influence as when it is true.

A Boolean parent promotes a Boolean child when both the parent being true increases the probability that the child is true and the parent being false decreases the probability that the child is true. Inversely, a Boolean parent inhibits a Boolean child when both the parent being true decreases the probability that the child is true and the parent being false increases the probability that the child is true.

Figure 2A:
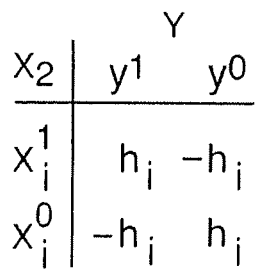
FIG. 2A illustrates a causal influence matrix for a Boolean parent and a Boolean child using parameter $h_i$.

FIG. 2A illustrates a causal influence matrix for a Boolean parent and a Boolean child using parameter $h_i$. According to CIM properties, each row in a causal influence matrix must sum to zero. Since a Boolean child only has two states this matrix only has two columns. Thus, only one parameter needs to be specified, per row; the other parameter is just the opposite sign so the row sums to zero. The assumption is also made that the Boolean parent being false has the exact opposite influence as the Boolean parent being true on the probability that the Boolean child is true. Using these two facts, the causal influence matrix can be filled using the single $h_i$ parameter, as shown in FIG. 2A.

Figure 2B:
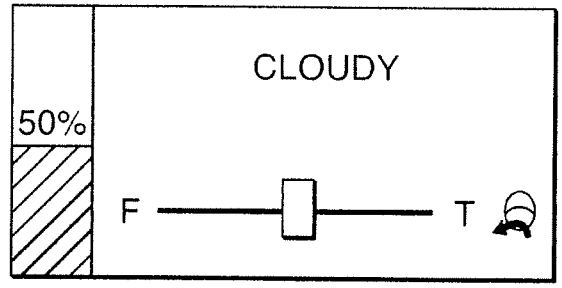
FIG. 2B illustrates an example of a Boolean parent, Cloudy, and a Boolean child, Rain.
Figure 2B:
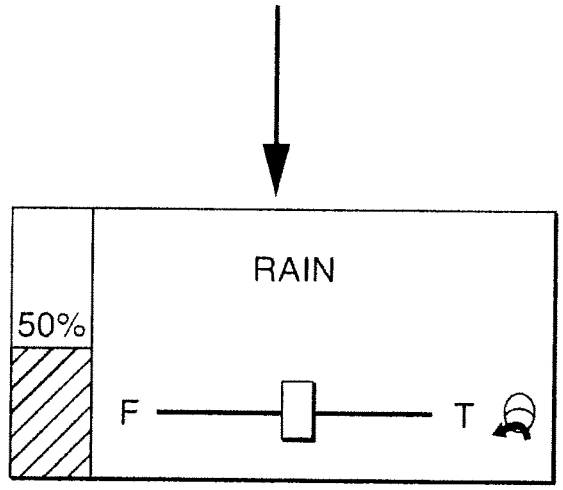

FIG. 2B illustrates an example of a Boolean parent, Cloudy, and a Boolean child, Rain. Based on past experience, it can be said that Cloudy has a fairly strong promoting influence on Rain. Therefore, the Cloudy-Rain relationship can be quantified with a parameter of, say, 0.6. FIG. 2C illustrates the resulting causal influence matrix for the Cloudy-Rain relationship. FIG. 2D illustrates the promoting effect of Cloudy on Rain in Rain's CPT.

Boolean Parent and Ordinal Child

To simplify the CIM for a Boolean-Ordinal edge to a single parameter, it is assumed that when the parent is true it exerts a linearly increasing or decreasing amount of influence across the child's states. This single parameter controls the slope of this linear function. Further, it is assumed that when the parent is false it has the equal and opposite influence on the child as when it is true.

A Boolean parent promotes an Ordinal child when both the parent being true increases the probability that the child takes on a higher level and the parent being false decreases the probability that the child takes on a higher level. Inversely, a Boolean parent inhibits an Ordinal child when both the parent being true decreases the probability that the child takes on a higher level and the parent being false increases the probability that the child takes on a higher level.

FIG. 3A illustrates a causal influence matrix for a Boolean parent and an Ordinal child. To simplify the causal influence matrix, it is first assumed that each row is a linear function of $h_i$. The child states are equally spaced on an x-axis with off/low at x=−1 and high at x=1. The line $y=h_i x$ is then sampled at the values of x corresponding to the child states. These values are then used as the causal influences in the row where the parent is true. This process is illustrated in FIG. 3A.

The second assumption is that the Boolean parent being false has the exact opposite influence as the Boolean parent being true on the probability of the Ordinal child taking on a higher value. So the values in the row where the Boolean parent is false are the inverses of the row where the Boolean parent is true.

Figures 3D, 4A:
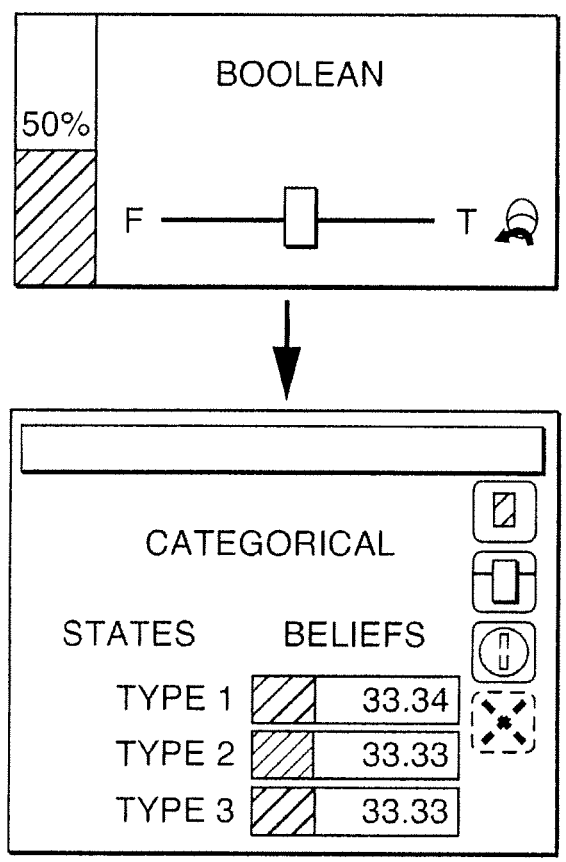
FIG. 3D illustrates the promoting effect of Sunny on Asphalt Temperature in Asphalt Temperature's CPT.
FIG. 4A illustrates an example of a Boolean parent and a Categorical child.

FIG. 3B shows an example of a Boolean parent, Sunny, and an Ordinal child, Asphalt Temperature. When it's Sunny outside, Asphalt Temperature is likely to moderately increase (and vice-versa) so a parameter of 0.4 is used. FIG. 3C illustrates the resulting causal influence matrix for Sunny and Asphalt Temperature. FIG. 3D illustrates the promoting effect of Sunny on Asphalt Temperature in Asphalt Temperature's CPT.

Boolean Parent and Categorical Child

The Boolean parent can be viewed as having a causal influence on each state of the Categorical child. This is effectively the same as splitting the Categorical child into multiple Boolean children, one for each state of the original Categorical child. So in this case the CIM can be simplified to m Boolean-Boolean parameters.

Figure 4B:
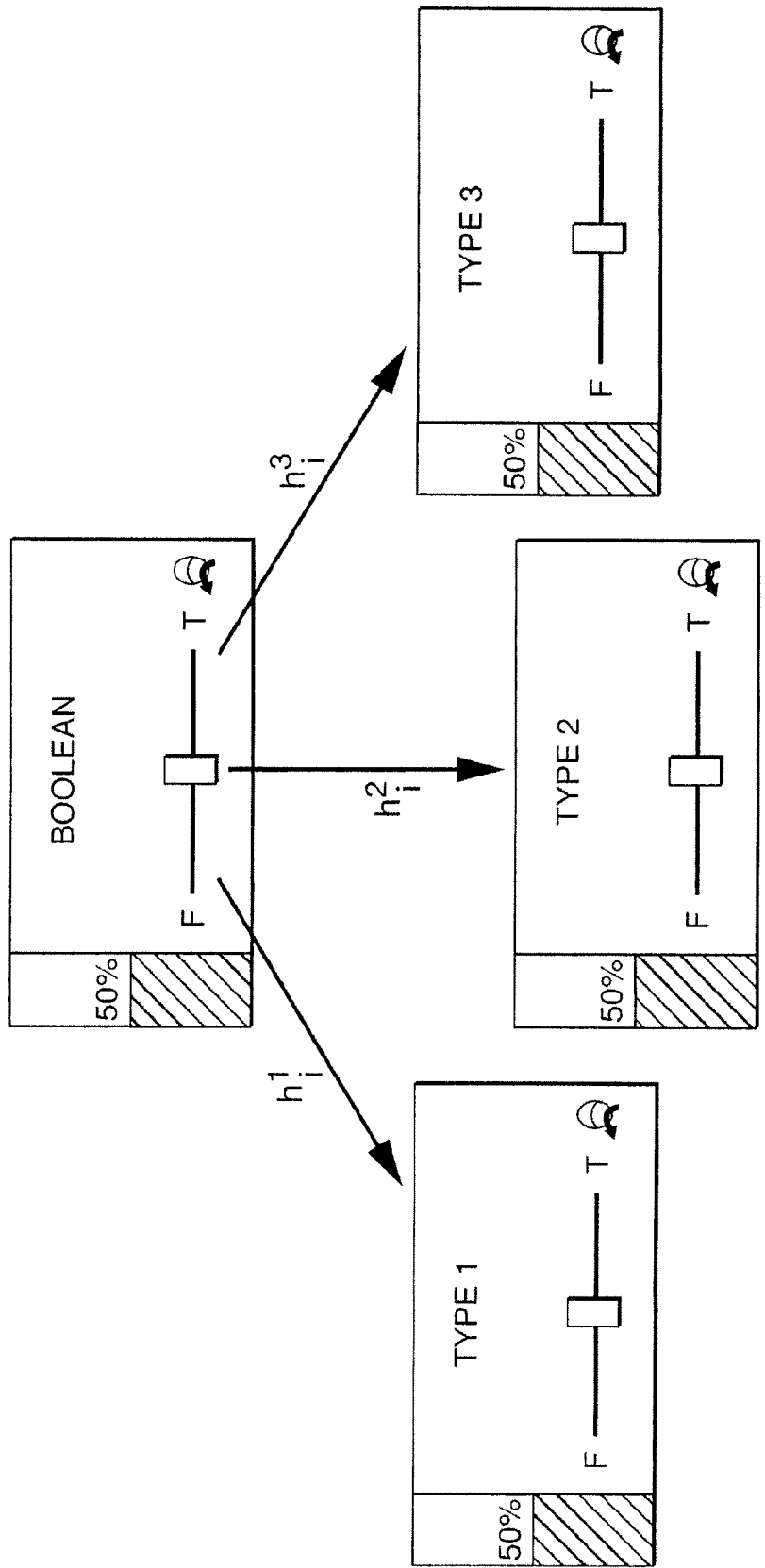
FIG. 4B illustrates the Categorical child shown in FIG. 4A split into three Boolean children, one for each state.

FIG. 4A illustrates an example of a Boolean parent and a Categorical child. FIG. 4B illustrates the Categorical child shown in FIG. 4A split into three Boolean children, one for each state. The Boolean parent can be viewed as having a causal influence on each state of the Categorical child. This is effectively the same as splitting the Categorical child into multiple Boolean children, one for each state of the original Categorical child. This is shown in FIG. 4A and FIG. 4B.

There are now effectively, multiple Boolean-Boolean relationships and a single Boolean-Boolean parameter can just be elicited from the user for each Boolean child. So instead of using only a single parameter for the Boolean-Categorical relation, one parameter is used for each state of the Categorical child. In the user interface of a BBN application, the Categorical child need not actually be shown as being split into multiple Boolean children. A multiple parameter user interface is just displayed, instead of a single parameter user interface.

FIG. 4C illustrates a causal influence matrix for a Boolean parent and a Categorical child. Just as the single Boolean-Boolean parameter was used to fill in each row in the causal influence matrix, the same approach can be used here for the Boolean-Categorical relationship. In each column the causal influence for the parent being true is set to the corresponding child state parameter $h_i^k$ and the causal influence for the parent being false is set to the negative of the corresponding child state parameter $-h_i^k$ (as shown in FIG. 4C. In addition, all of the child state parameters must be constrained to sum to zero, $$\sum_{k=1}^{m} h_i^k = 0$$

so that each row in the causal influence matrix will also sum to zero.

This approach ensures that each row in the causal influence matrix sums to zero and adheres to the promoting/inhibiting idea, although in this case the Boolean parent exhibits a promoting or inhibiting effect on each state of the Categorical child.

Ordinal Parent and Boolean Child

To simplify the CIM for an Ordinal-Boolean edge, it is assumed that the states of the parent exert a linearly increasing or decreasing amount of influence on the child being true. This single parameter controls the slope of this linear function. It is further assumed that each state of the parent has an equal and opposite influence on the child being false.

An Ordinal parent promotes a Boolean child when both the parent taking on a higher level increases the probability that the child is true and the parent taking on a lower level decreases the probability that the child is true. Inversely, an Ordinal parent inhibits a Boolean child when both the parent taking on a higher level decreases the probability that the child is true and the parent taking on a lower level increases the probability that the child is true.

FIG. 5A illustrates a causal influence matrix for an Ordinal parent and a Boolean child. To simplify the causal influence matrix, it is first assumed that each column is a linear function of $h_i$. The parent states are equally spaced on an x-axis with off/low at x=−1 and high at x=1. The line y=$h_i$x is then sampled at the values of x corresponding to the parent states. These values are then used as the causal influences in the column where the child is true. This process is illustrated in FIG. 5A.

Because the child is Boolean the causal influence matrix only has two columns. Thus the value in the second column in each row can simply be set as the inverse of the value in the first column so that each row sums to zero.

FIG. 5B shows an example of an Ordinal parent, Fuel Level, and a Boolean child, Fuel Warning. Fuel Warning is much more likely to be true when Fuel Level is empty (and vice-versa) so a parameter of −0.8 can be used. FIG. 5C illustrates the resulting causal influence matrix for the Ordinal parent Fuel Level and Boolean child Fuel Warning, for $h_i$−0.8. FIG. 5D illustrates the inhibiting effect of Fuel Level on Fuel Warning in Fuel Warning's CPT.

Ordinal Parent and Ordinal Child

To simplify the CIM for an Ordinal-Ordinal edge, it is assumed that the parent has either a linearly promoting or linearly inhibiting influence on the child. The single parameter determines the degree to which the parent states either promote or inhibit the child states.

An Ordinal parent promotes an Ordinal child when both the parent taking on a higher level increases the probability that the child takes on a higher level and the parent taking on a lower level decreases the probability that the child takes on a higher level. Inversely, an Ordinal parent inhibits an Ordinal child when both the parent taking on a higher level decreases the probability that the child takes on a higher level and the parent taking on a lower level increases the probability that the child takes on a higher level.

To simplify the causal influence matrix, the techniques for the Boolean-Ordinal and Ordinal-Boolean relationships can be combined. First, the states of the parent are spaced out equally along a x-axis from off/low at x=−1 to high at x=1, and the states of the child are spaced out equally along a y-axis from off/low at y=−1 to high at y=1.

Next, a 3-dimensional surface z is created as follows:

$$z = \begin{cases} -hx + hy + h & h \geq 0, x \geq y \\ hx - hy + h & h \geq 0, x < y \\ hx + hy = h & h < 0, x \geq -y \\ -hx - hy - h & h < 0, x < -y \end{cases}$$

This surface is then sampled at points (x, y) corresponding to all combinations of parent and child states. These sampled values from this surface are used as the values of the causal influence matrix for the corresponding parent and child states.

Figure 6A:
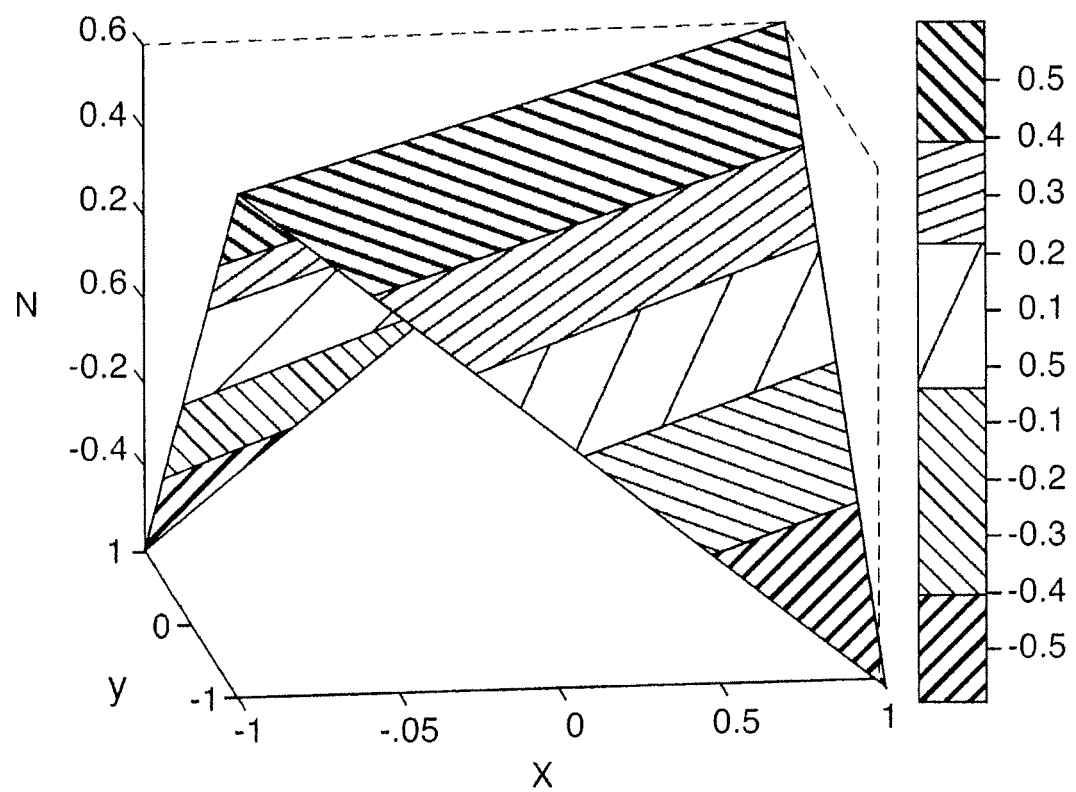
FIG. 6A illustrates a causal influence surface for an Ordinal parent and Ordinal child, for h greater than or equal to 0, namely h=0.6.
Figure 6B:
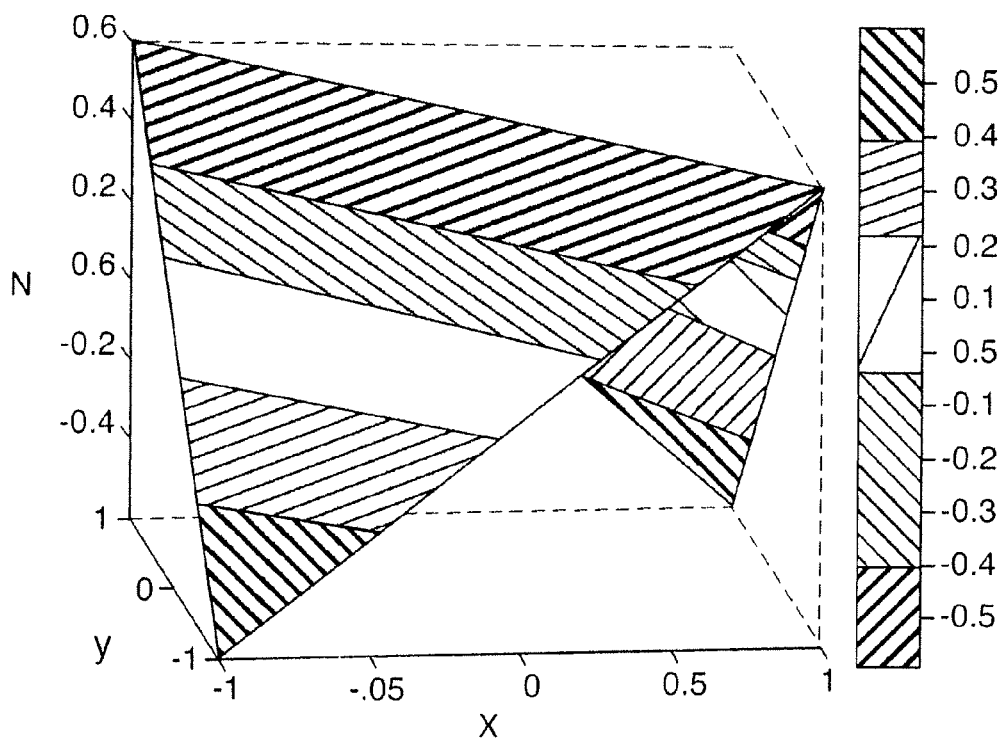
FIG. 6B illustrates a causal influence surface for an Ordinal parent and Ordinal child, for h less than 0, namely h=−0.6.

This surface represents a linear relationship between the parent and child nodes. FIG. 6A illustrates a causal influence surface for an Ordinal parent and Ordinal child, for h greater than or equal to 0, namely h=0.6. FIG. 6B illustrates a causal influence surface for an Ordinal parent and Ordinal child, for h less than 0, namely h=−0.6. As shown in FIG. 6A and FIG. 6B, these surfaces look like two upside-down triangles. The surface has a maximum along the line y=x if h≥0 and along y=−x if h<0. The minimums are at (−1, 1) and (1, −1) if h≥0 and at (−1, −1) and (1, 1) if h<0. These maximums and minimums are equal to h.

It is recalled that positive values of h represent a promoting relationship and negative values of h represent an inhibiting relationship. So if h is positive the surface gives the maximum causal influence values when the child takes on the same state as the parent and minimum causal influence values when the child takes on the opposite state as the parent. Inversely, if h is negative this surface gives the maximum causal influence values when the child takes on the opposite state as the parent and minimum causal influence values when the child takes on the same state as the parent.

After sampling the causal influence surface the rows in the causal influence matrix are not guaranteed to sum to zero. To enforce this constraint, each row can simply be normalized to sum to zero as follows, where $\hat{h}_{ijk}$ represents the un-normalized causal influence values obtained by sampling the surface:

$$h_{ijk} = \hat{h}_{ijk} - \frac{1}{m}\sum_{k=1}^{m} \hat{h}_{ijk}$$

Figure 6C:
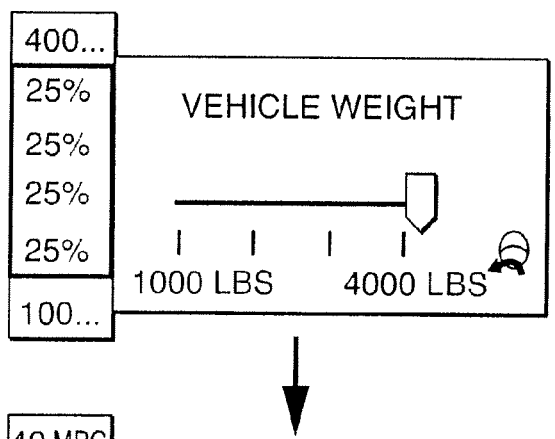
FIG. 6C illustrates an example of an Ordinal parent, Vehicle Weight, and an Ordinal child, Fuel Efficiency.
Figure 6C:
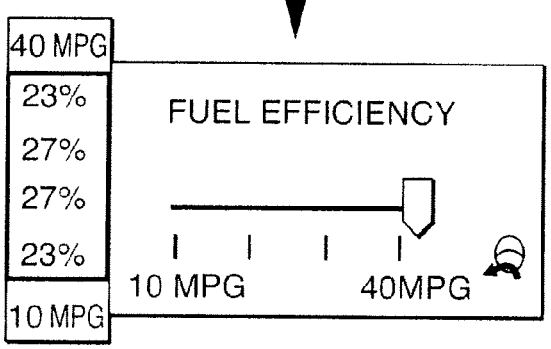

FIG. 6C illustrates an example of an Ordinal parent, Vehicle Weight, and an Ordinal child, Fuel Efficiency. FIG. 6D illustrates the resulting causal influence matrix for the Ordinal parent and Ordinal child, for $h_i$−0.4. When Vehicle Weight is high, this decreases the probability that Fuel Efficiency is high (and vice-versa) so a parameter of −0.4 can be used. FIG. 6E illustrates the inhibiting effect of Vehicle Weight on Fuel Efficiency in Fuel Warning's CPT.

Ordinal Parent and Categorical Child

Figure 7A:
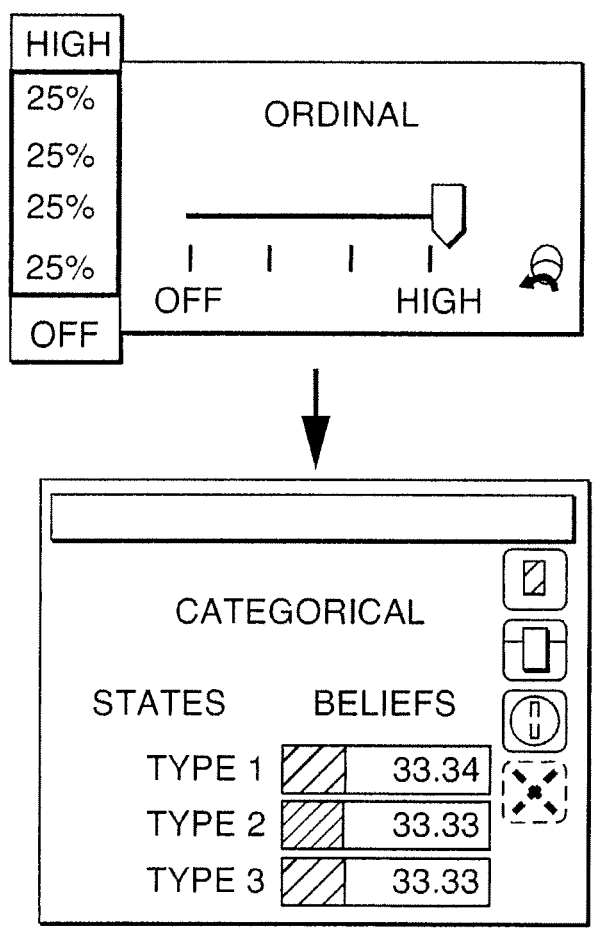
FIG. 7A illustrates an example of an Ordinal parent and a Categorical child.
Figure 7B:
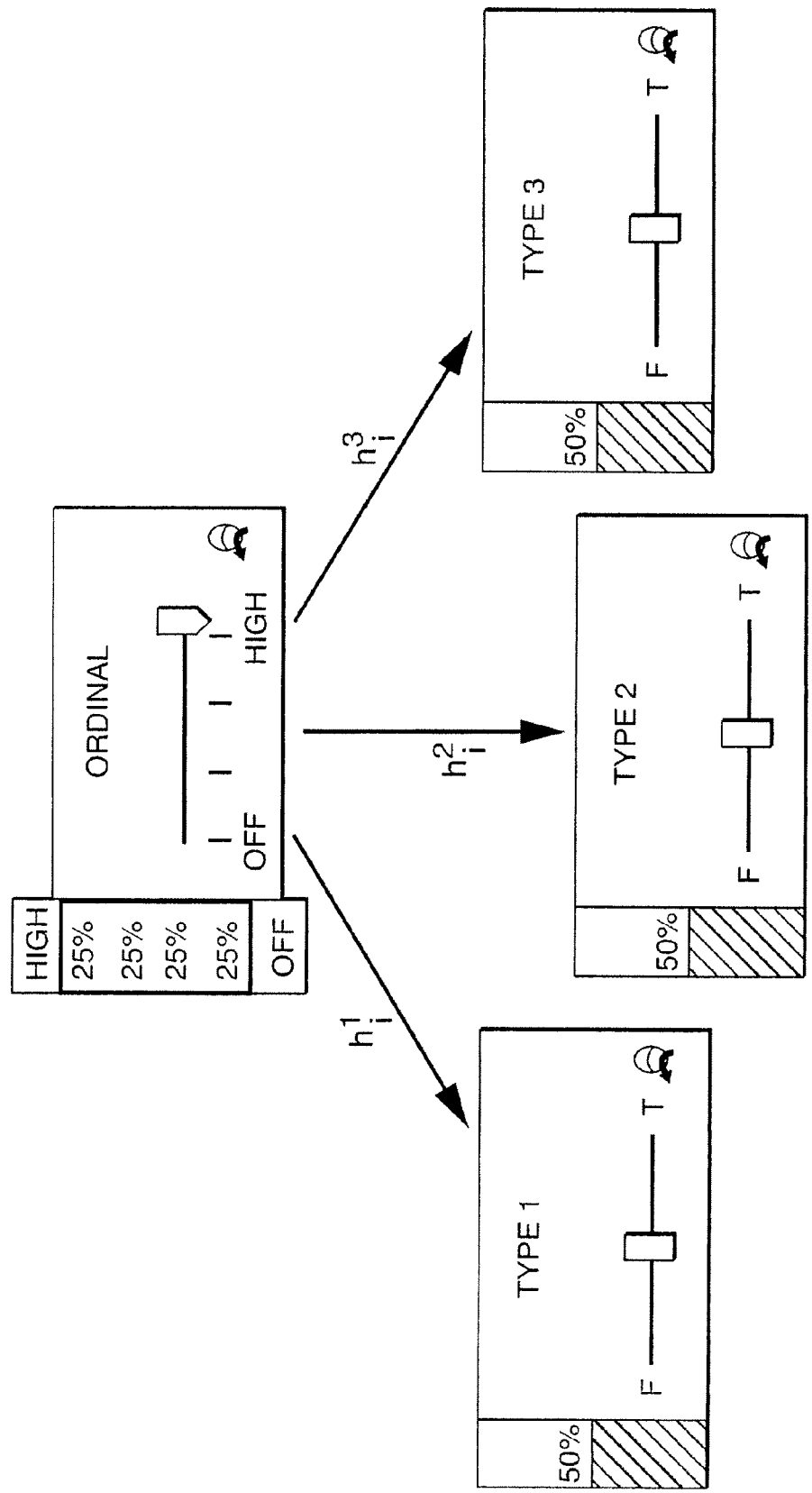
FIG. 7B illustrates the Categorical child shown in FIG. 7A split into three Boolean children, one for each state.

FIG. 7A illustrates an example of an Ordinal parent and a Categorical child. The Ordinal parent can be viewed as having a causal influence on each state of the Categorical child. This is effectively the same as splitting the Categorical child into multiple Boolean children, one for each state of the original Categorical child. So in this case the CIM can be simplified to m Ordinal-Boolean parameters. FIG. 7B illustrates the Categorical child shown in FIG. 7A split into three Boolean children, one for each state.

There now effectively are multiple Ordinal-Boolean relationships and just a single Ordinal-Boolean parameter can be elicited from the user for each Boolean child. So instead of using only a single parameter for the Ordinal-Categorical relation, one parameter is used for each state of the Categorical child. In the user interface of a BBN application the Categorical child doesn't actually have to be shown being split into multiple Boolean children. A multiple parameter user interface can just be displayed, instead of a single parameter user interface.

Figures 7C, 8A:
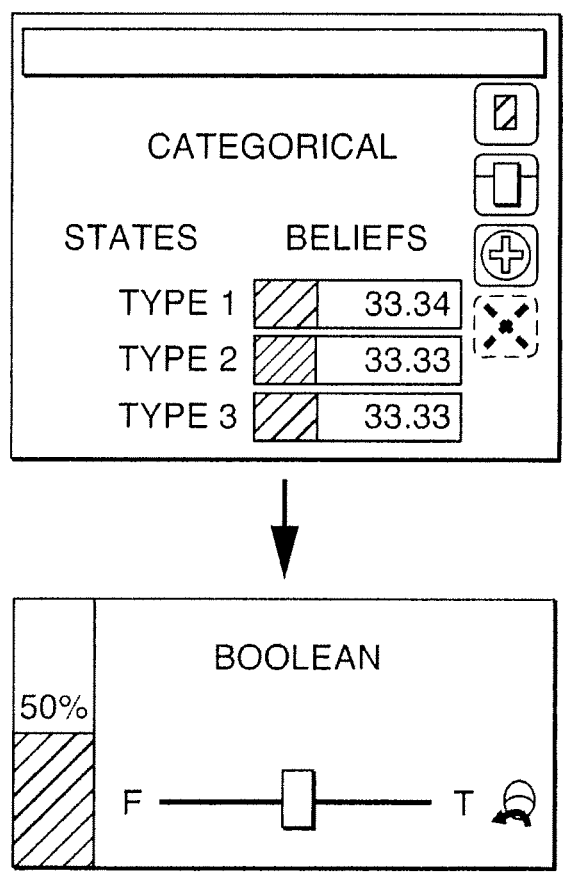
FIG. 7C illustrates a causal influence matrix for an Ordinal parent and a Categorical child.
FIG. 8A illustrates an example of a Categorical parent and a Boolean child.

FIG. 7C illustrates a causal influence matrix for an Ordinal parent and a Categorical child. Just as the single Ordinal-Boolean parameter was used to fill in each row in the causal influence matrix, the same approach can be used for the Ordinal-Categorical relationship. In each column the corresponding child state parameter $h_i^k$ is used as the slope of a line that is sampled to determine the causal influences in that column as shown in FIG. 7C. In addition, all of the child state parameters must be constrained to sum to zero, $$\sum_{k=1}^{m} h_i^k = 0,$$

so that each row in the causal influence matrix will also sum to zero.

This approach ensures that each row in the causal influence matrix sums to zero and adheres to the promoting/inhibiting idea; although in this case the Ordinal parent can exhibit a promoting or inhibiting effect on each state of the Categorical child.

Categorical Parent and Boolean Child

Figure 8B:
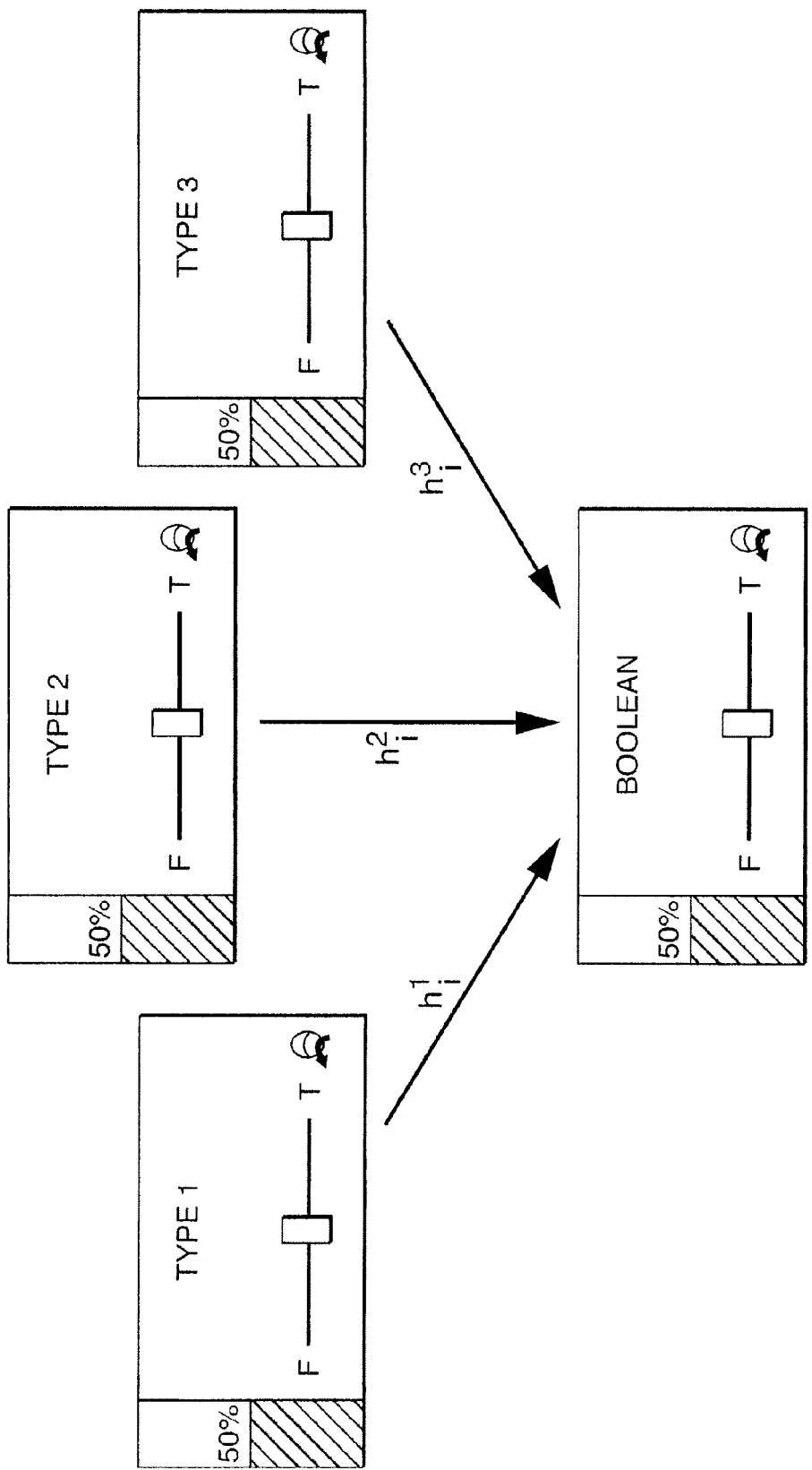
FIG. 8B illustrates the Categorical parent shown in FIG. 8A split into three Boolean parents, one for each state.

FIG. 8A illustrates an example of a Categorical parent and a Boolean child. Each state of the Categorical parent can be viewed as having an independent causal influence on the Boolean child. This is effectively the same as splitting the Categorical parent into multiple Boolean parents, one for each state of the original Categorical parent. FIG. 8B illustrates the Categorical parent shown in FIG. 8A split into three Boolean parents, one for each state.

There now are effectively multiple Boolean-Boolean relationships and just a single Boolean-Boolean parameter can be elicited from the user for each Boolean parent. So instead of using only a single parameter for the Categorical-Boolean relation, one parameter is used for each state of the Categorical parent. In the user interface of a BBN application, the Categorical parent does not actually have to be shown as being split into multiple Boolean parents. A multiple parameter user interface can just be displayed instead of a single parameter user interface.

Figures 8C, 9A:
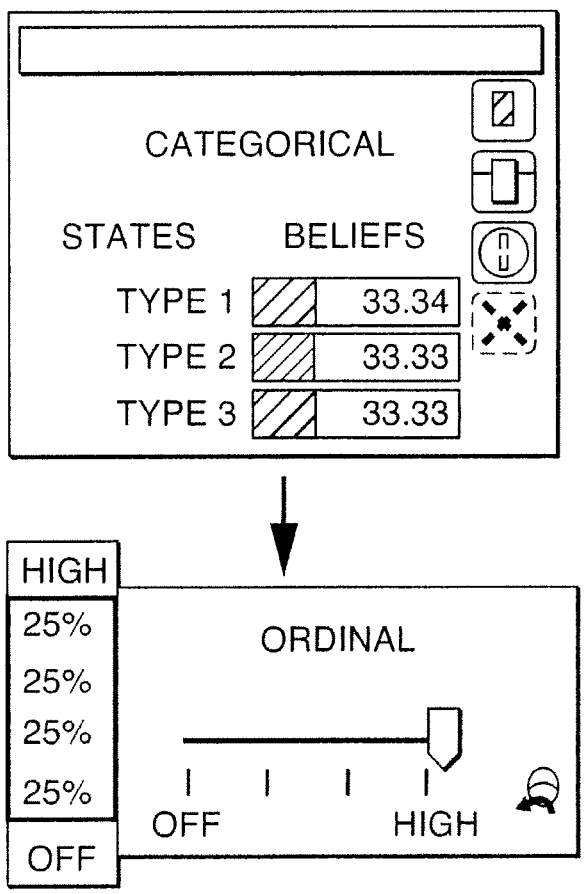
FIG. 8C illustrates a causal influence matrix for a Categorical parent and a Boolean child.
FIG. 9A illustrates an example of a Categorical parent and an Ordinal child.

FIG. 8C illustrates a causal influence matrix for a Categorical parent and a Boolean child. Just as the single Boolean-Boolean parameter was used to fill in each row in the causal influence matrix, the same approach can be used here for the Categorical-Boolean relationship. In each row the causal influence for the child being true is set to the corresponding parent state parameter $h_i^j$ and the causal influence for the child being false is set to the negative of the corresponding parent state parameter $-h_i^j$ as shown in FIG. 8C.

This approach ensures that each row in the causal influence matrix sums to zero and adheres to the promoting/inhibiting idea; although in this case each state of a Categorical parent can exhibit a promoting or inhibiting effect on the Boolean child.

Categorical Parent and Ordinal Child

Figure 9B:
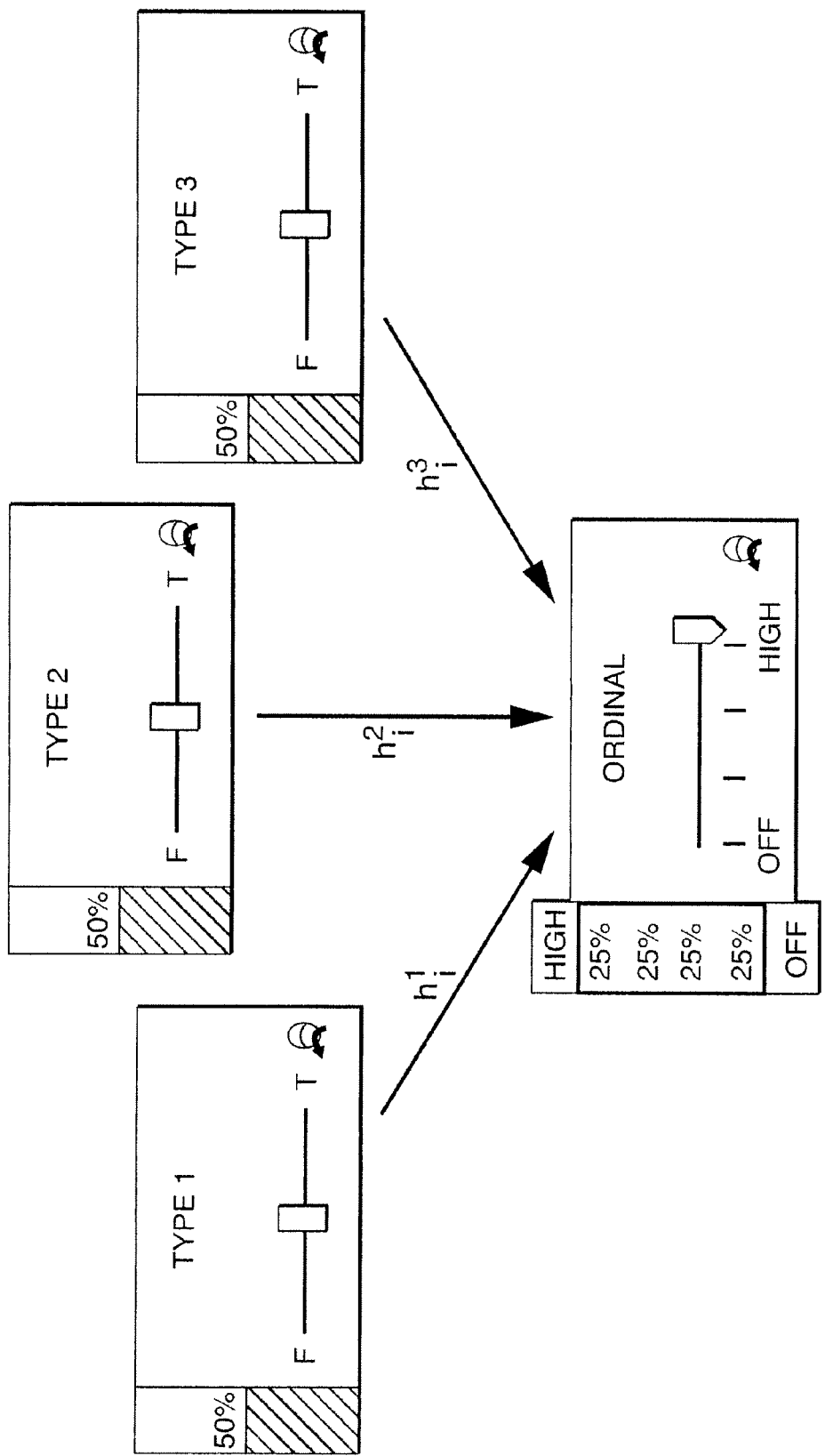
FIG. 9B illustrates the Categorical parent shown in FIG. 9A split into three Boolean parents, one for each state.

FIG. 9A illustrates an example of a Categorical parent and an Ordinal child. Each state of the Categorical parent can be viewed as having an independent causal influence on the Ordinal child. This is effectively the same as splitting the Categorical parent into multiple Boolean parents, one for each state of the original Categorical parent, just as in the case of the Categorical-Boolean relationship. FIG. 9B illustrates the Categorical parent shown in FIG. 9A split into three Boolean parents, one for each state.

There are now effectively multiple Boolean-Ordinal relationships and a single Boolean-Ordinal parameter can just be elicited from the user for each Boolean parent. So instead of using only a single parameter for the Categorical-Ordinal relation, one parameter is used for each state of the Categorical parent. In the user interface of a BBN application the Categorical parent doesn't actually have to be shown as being split into multiple Boolean parents. A multiple parameter user interface can just be displayed instead of a single parameter user interface.

Figure 9C:
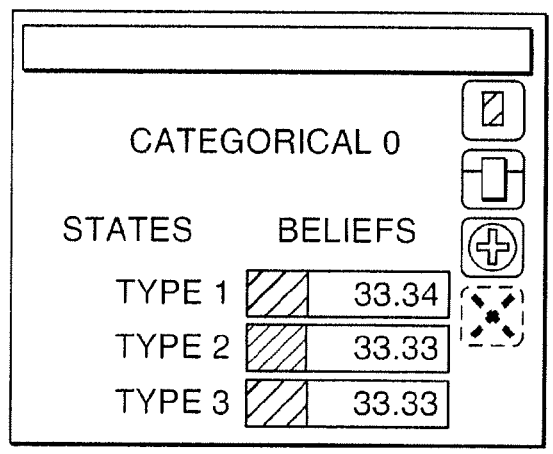
FIG. 9C illustrates a causal influence matrix for a Categorical parent and an Ordinal child.

FIG. 9C illustrates a causal influence matrix for a Categorical parent and an Ordinal child. Just as the single Boolean-Ordinal parameter was used to fill in each row in the causal influence matrix, the same approach can be used here for the Categorical-Ordinal relationship. In each row the corresponding parent state parameter $h_i^j$ is used as the slope of a line that is sampled to determine the causal influences in that row as shown in FIG. 9C. This approach ensures that each row in the causal influence matrix sums to zero and adheres to the promoting/inhibiting idea; although in this case each state of a Categorical parent can exhibit a promoting or inhibiting effect on the Ordinal child.

Categorical Parent and Categorical Child

Figure 10A:
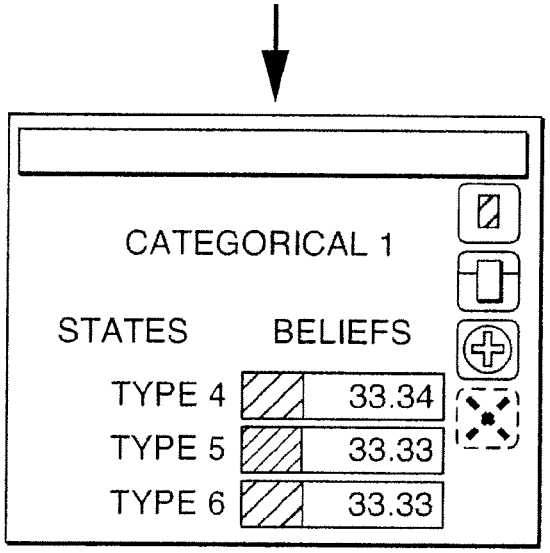
FIG. 10A illustrates an example of a Categorical parent and a Categorical child.
Figure 10B:
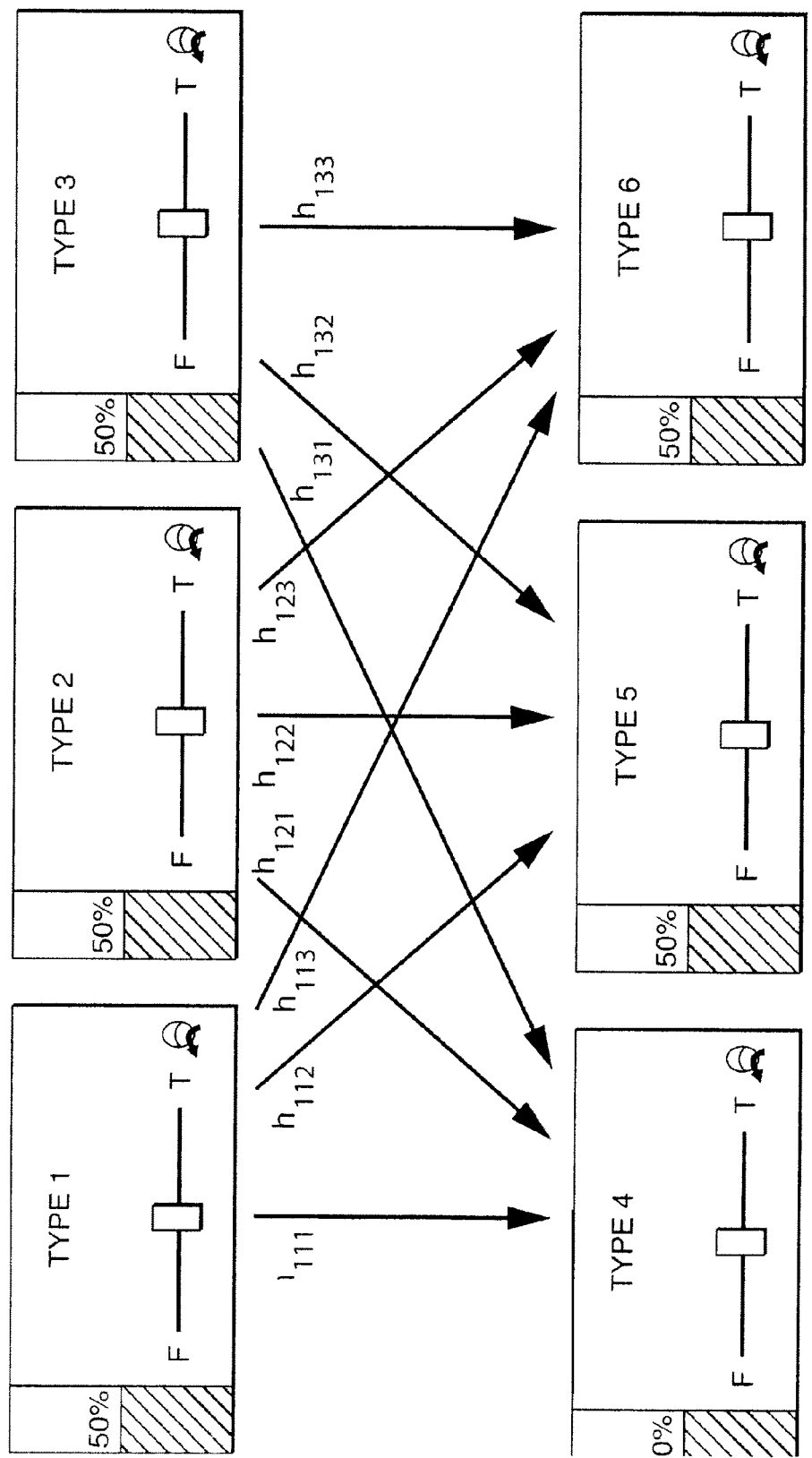
FIG. 10B illustrates the Categorical parent and the Categorical child shown in FIG. 10A split into multiple Boolean nodes, one for each state.

FIG. 10A illustrates an example of a Categorical parent and a Categorical child. As in previous embodiments, in which a Categorical node is split into multiple Boolean nodes, one for each state, both the parent and child in a Categorical-Categorical relationship can be split up, as shown in FIG. 10B. FIG. 10B illustrates the Categorical parent and the Categorical child shown in FIG. 10A split into multiple Boolean nodes, one for each state.

This essentially means that each state of the Categorical parent has a causal influence on each state of the Categorical child. FIG. 10C illustrates a causal influence matrix for a Categorical parent and a Categorical child. These parameters are just the regular causal influence model parameters.

User Interfaces

The reduced-number-of-parameters approach, described above, could be used in a basic, stripped-down user interface for novice users. It could also be used by more experienced users to quickly build initial CPTs that can later be refined by hand or by data.

There are many possible ways to elicit these simplified parameters from a user in a user interface. Users could specify the parameters in the range [−1, 1] by a slider or could specify an integer in some range, for example [−5, 5]. Increment and decrement buttons could be used to increase or decrease this integer parameter, respectively. Various attributes of the edges could also be based on these parameters, such as line color, line thickness, arrowhead size, and arrowhead shape. For example, a thicker greener line could represents a more promoting relationship, a thicker redder line could represent a more inhibiting relationship, and a thinner greyer line could represent a less promoting/inhibiting relationship, just by way of example.

Figure 11A:
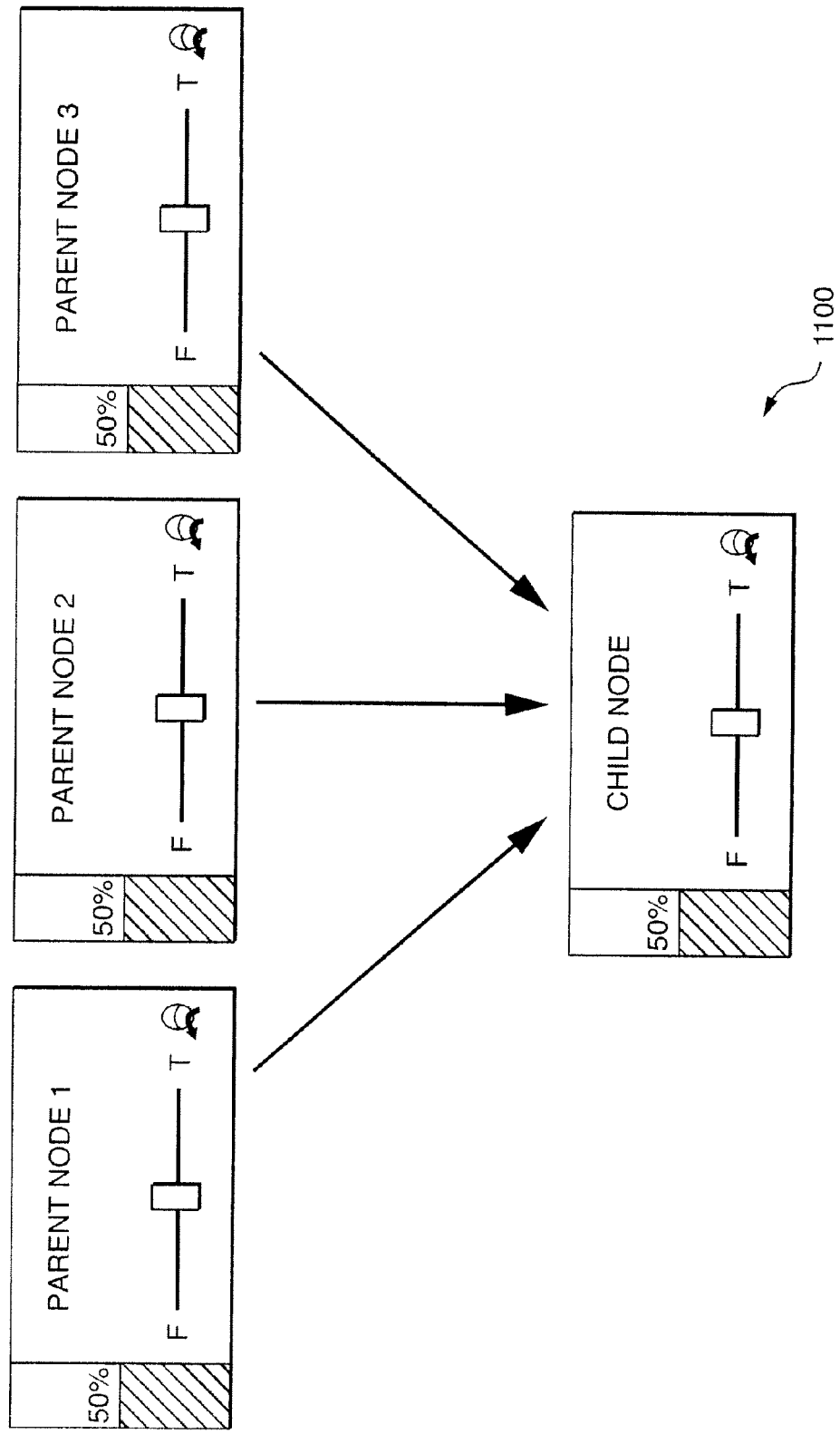
FIG. 11A illustrates a user interface that allows users to adjust relationships on the nodes and links within the belief network itself.

FIG. 11A illustrates a user interface 1100 that allows users of a belief network to adjust relationships on the nodes and links within the belief network itself, and that has been described in the parent '085 application. The interface illustrated in FIG. 11A allows the user to adjust relationships on the nodes and links within the belief network itself. In the illustrated user interface, each node contains two states, true and false. Users indicate the strength of a relationship between nodes by adjusting a value on the link between them. This value is used as a parameter to the CIM algorithm to fill in the CPT for the child node.

The interface shown in FIG. 11A greatly reduces the number of CPT values that users must enter, by only requiring the user to input a linear number of relationships. For example, in FIG, the child node has three parents, so that $2^3$, or 8, values would normally have been required to be entered in the CPT. The use interface shown in FIG. 11A requires the user to indicate strengths on only 3 links. Relationships between parent nodes and child nodes can be various degrees (i.e., strengths) of either inhibiting or promoting.

The user interface 1100 illustrated in FIG. 11A allows users to quickly and intuitively fill in a CPT for a belief network. User initiated operations may include, but are not limited to, the following:

setting a link strength;
choosing a link type (e.g., inhibiting or prohibiting);
linking and/or unlinking nodes;
setting and/or retracting evidence; and
adding and/or removing nodes.

By allowing user operations as described above, the user interface 1100 provides in substantial real time visual/graphical presentations of a priori relationships (inhibiting/promoting) among the nodes in the network.

In the present disclosure, specialized node user interfaces (UI) are further described that are based on node types, and in particular, on parent & child node types that lets us simplify the causal influence model parameters down to possibly a single parameter per parent, regardless of number of states of parent and child.

A specialized node UI based on node types could be constructed as follows. Consider a generic discrete node X that has m discrete states $(x^1, x^2, \ldots, x^m)$. More specific types of discrete nodes with specific states could be defined. In Boolean type nodes, two states for true and false $(x^1, x^0)$ represent an event occurring or not occurring. For example, the node LightSwitchOn could be true or false. In Ordinal type nodes, m ordered states $(x^1, x^2, \ldots, x^m)$, represent a quantity or amount of something, states ordered from low to high. For example, node FuelLevel can have states (empty, low, medium, full) or (0 L, 10 L, 20 L, 30 L). In Categorical type nodes can have m unordered states $(x^1, x^2, \ldots, x^m)$, any discrete node not falling into other node types. For example, node VehicleType can have states (car, truck, van).

The assumptions regarding nodes' states could be taken advantage of, to provide a simplified user interface. A Boolean node UI may include, for example, one or more of the following: a mechanism for displaying belief that takes advantage of Boolean states; a mechanism for displaying and providing input for evidence that takes advantage of Boolean states; a mechanism for displaying and providing input for baseline that takes advantage of Boolean states.

FIG. 11B illustrates one example of a Boolean user interface that includes a mechanism for displaying and providing input for baseline that takes advantage of Boolean states. In particular, FIG. 11B illustrates a Boolean user interface with belief for true as vertical bar, evidence as horizontal slider, and no baseline display/input.

Similarly, an Ordinal user interface could include one or more of the following: a mechanism for displaying belief that takes advantage of Ordinal states; a mechanism for displaying and providing input for evidence that takes advantage of Ordinal states; and a mechanism for displaying and providing input for baseline that takes advantage of Ordinal states FIG. 11C illustrates one example of an Ordinal user interface with beliefs as vertical bar, evidence as horizontal slider, and no baseline display/input.

Likewise, a Categorical user interface could include one of more of the following: a mechanism for displaying belief that takes advantage of Categorical states; a mechanism for displaying and providing input for evidence that takes advantage of Categorical states; and a mechanism for displaying and providing input for baseline that takes advantage of Categorical states.

Figure 11D:
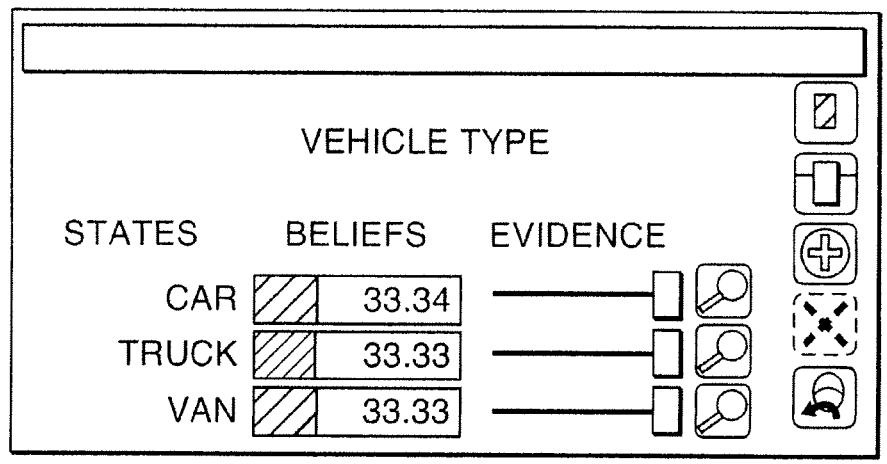
FIG. 11D illustrates an example of a Categorical user interface with beliefs as horizontal bars, evidence as horizontal sliders, and no baseline display/input.

FIG. 11D illustrates one example of a Categorical user interface with beliefs as horizontal bars, evidence as horizontal sliders, and no baseline display/input.

A specialized edge UI could be constructed, based on the parent and child node types described above (Boolean, Ordinal, and Categorical). Using these parent and child node types, the user could actually be asked for less parameters than the CIM, and then these parameters could be converted into CIM parameters. An ideal goal would be to ask the user for only one parameter per parent. A different method has to be used for each one of the following combinations of parent & child node types: Boolean-Boolean; Boolean-Ordinal Boolean-Categorical Ordinal-Boolean Ordinal-Ordinal Ordinal-Categorical Categorical-Boolean Categorical-Ordinal; and Categorical-Categorical.

For each of the above parent-child combinations, there are multiple methods that can be used, including but not limited to linear promoting/inhibiting, and exponential promoting/inhibiting. In other words, a user interface may be asked for even less parameters than the CIM, taking advantage of parent and child node types specified above. These parameters can then be converted to CIM parameters, which in turn are converted into a CPT.

Figure 11E:
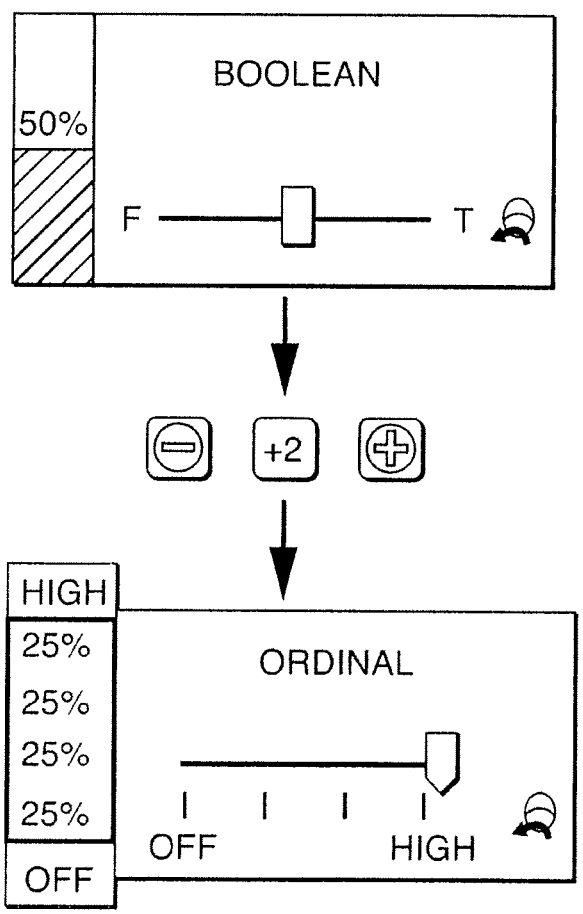
FIG. 11E illustrates a user interface including a mechanism to display and provide input for simplified parameters that can be converted into causal influence model parameters directly on the edges in the Bayesian network display.

A user interface may thus include mechanism to display and provide input for simplified parameters that can be converted into causal influence model parameters directly on the edges in the Bayesian network display. FIG. 11E illustrates a user interface including a mechanism to display and provide input for simplified parameters that can be converted into causal influence model parameters directly on the edges in the Bayesian network display. In particular, the illustrated UI provides an example of a single parameter converted into CIM parameters for a Boolean parent and Ordinal child using integers between [−5, +5] to display the single parameter and plus/minus buttons to increment/decrement the parameter.

Figure 11F:
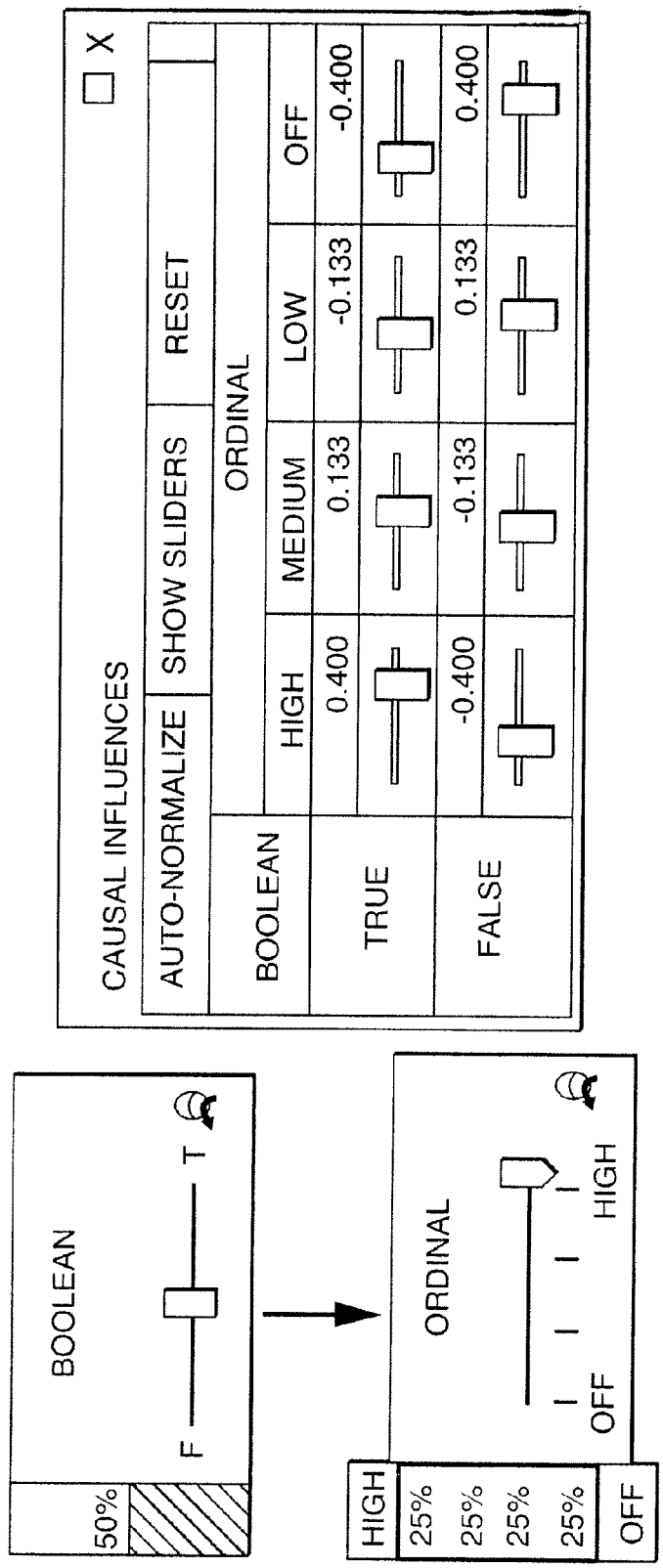
FIG. 11F illustrates an example of a user interface with CIM parameters in a table with both textual and slider display/input in a separate modeless window.
Figure 11G:
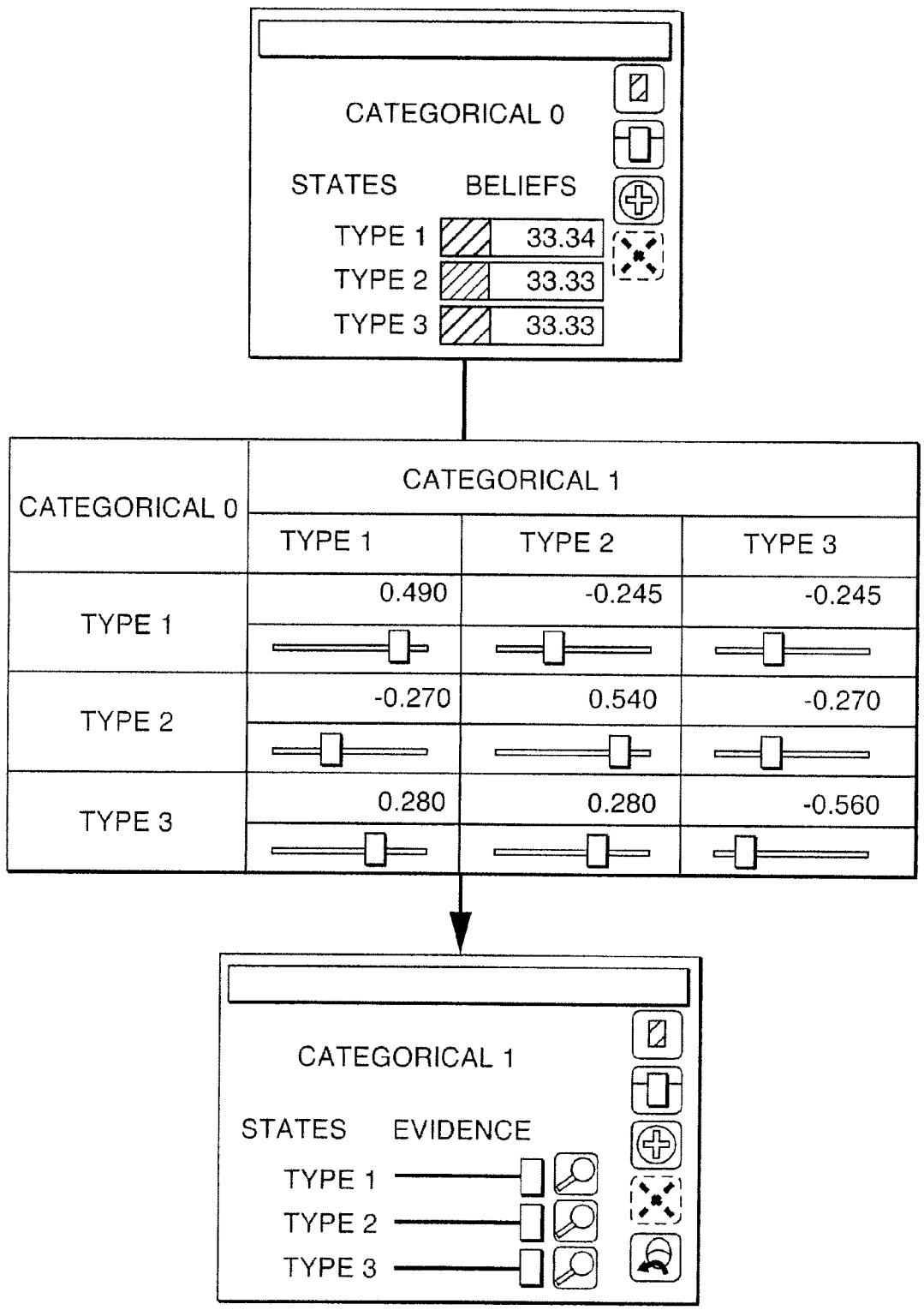
FIG. 11G illustrates an example of a user interface with CIM parameters in a table with both textual and slider display/input on the edge in a BBN display.

FIG. 11F and FIG. 11G provide exemplary screenshots of the user interface for full causal influence model parameters on edges. FIG. 11F illustrates an example of a UI with CIM parameters in a table with both textual and slider display/input in a separate modeless window. FIG. 11G illustrates an example of a UI with CIM parameters in a table with both textual and slider display/input on the edge in a BBN display.

With the Boolean and Ordinal nodes types, a commonly experienced confusion about "beliefs" versus "evidence" may be addressed by visually separating these two elements (belief being represented by the vertical bar, evidence via the horizontal slider). This may also provide additional affordances (or lack thereof) to show that evidence is something that could be entered by the user. The Ordinal node (which may be shown e.g. with 4 states to represent the intermediate steps from "none" to "full"), breaks the vertical belief bar into segments to represent the distribution across the states. A straightforward fuzzification of these results may represent this belief as a non-segmented bar.

The categorical node UI may uses the standard renderer, with buttons for collapsing/expanding evidence sliders or belief bars, adding/removing states, and retracting evidence.

Figure 11H:
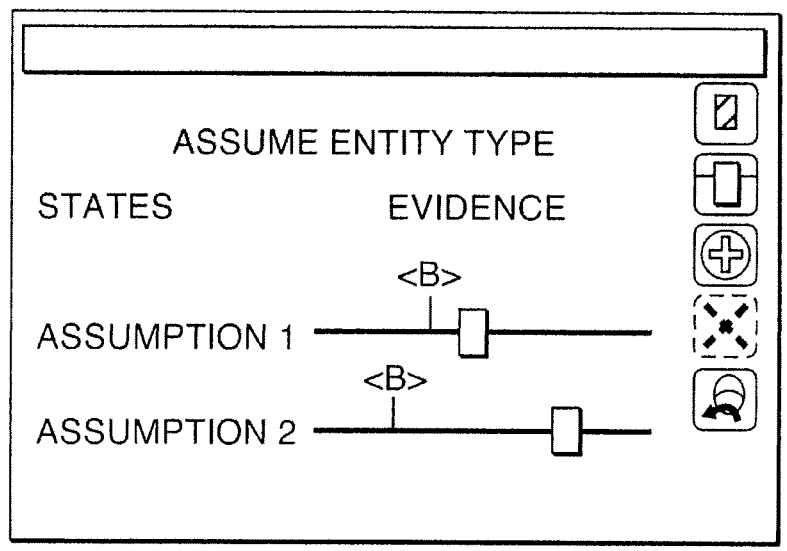
FIG. 11H illustrates a user interface that allows confidence intervals and baseline probabilities to be expressed on posted evidence.

User interfaces may also be developed for expressing probability ranges and baseline probabilities. FIG. 11H illustrates a user interface that allows confidence intervals and baseline probabilities to be expressed on posted evidence Given that experts may struggle to express in any numerical form their uncertainty about evidence, an interface may allow the user to "grow" a confidence interval around any evidence that is posted. Similarly in a "dual slider" interface the baseline probability can be expressed. These two additional capabilities, expressing a confidence interval and a baseline, may represent a higher level of complexity in the user interface.

Figure 11I:
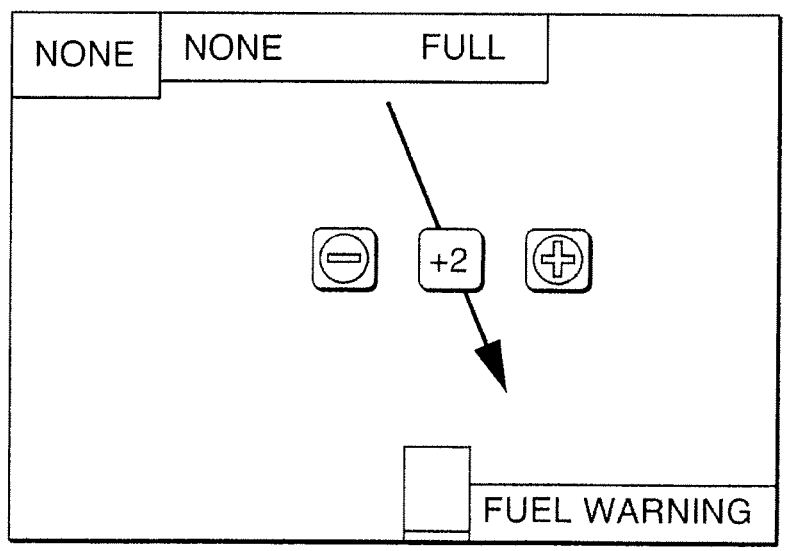
FIG. 11I illustrates a user interface for manipulating the strength of a causal relationship between variables.

FIG. 11I illustrates a user interface for manipulating the strength of a causal relationship between variables. This interface results from methods that were developed for exploiting the CIM's ability to more rapidly specify causal relations. Because the CIM allows the influence between Boolean and Ordinal nodes to be expressed as a single number, the interface shown in FIG. 11I has been developed.

In the illustrated user interface, the user has moused-over the link between the two nodes, and buttons have appeared allowing the user to change the excitatory or inhibitory nature of the link. By adjusting this to various ends of a discrete range (or a continuous range using a slider rather than the two buttons shown) for each parent, the user completely specifies the CPT for the child. In the cases where a child or parent variable is Categorical, additional buttons appear for each state. This interface becomes clumsy for Categorical-to-Categorical variable relationships, as the relationship between each child state and each parent state must be specified. In practice, however, it has been found that experts are able to reformulate their reasoning in a form that uses primarily Ordinal or Boolean types.

Figure 11J:
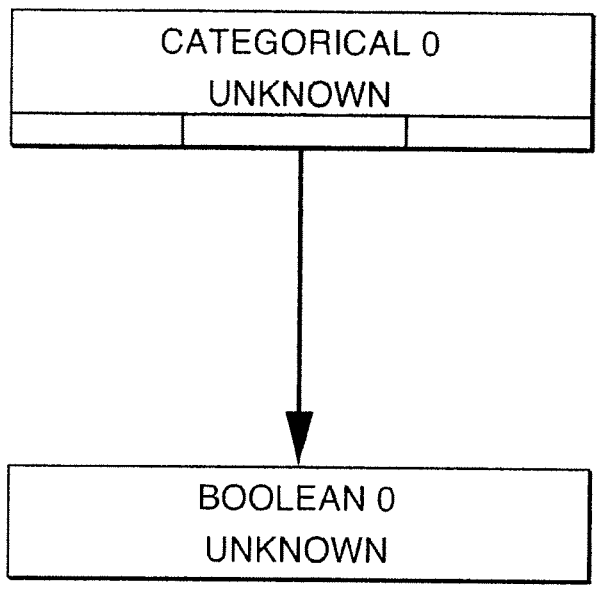
FIG. 11J and FIG. 11K illustrate additional embodiments of a user interface that provide an improved technique for handling the four types of edges connected to a Categorical node on one side of the edge, and a Boolean node or Ordinal node on the other side of the edge.
Figure 11K:
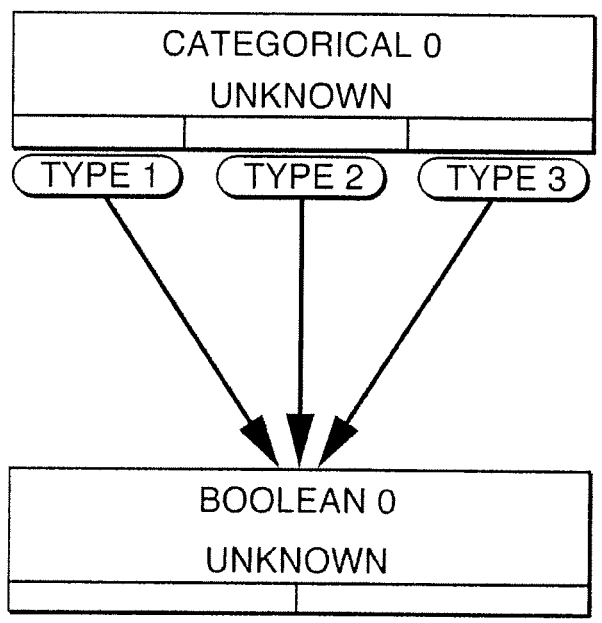

FIG. 11J and FIG. 11K illustrate additional embodiments of the present disclosure in which a user interface may provide a better way of handling the four types of edges connected to a Categorical on one side of the edge, and a Boolean or Ordinal on the other side of the edge. In such cases, normally a plain black edge connects the two nodes. When a user points the mouse over that edge, it disappears and multiple "sub-edges" are drawn in its place, one sub-edge for each state of the Categorical node. Each state of the Categorical node is also drawn. Each sub-edge is displayed in a manner to display the parameter associated with the categorical state it is connected to. For example, hue, saturation, and width are three ways the sub-edge can display its parameter. When the user points the mouse over one of the sub-edges, the single parameter adjustment user interface is displayed to allow the user to adjust the parameter corresponding to the sub-edge. When the user moves the mouse away from the edge, the sub-edges disappear and the single black edge is displayed again.

Figure 11L:
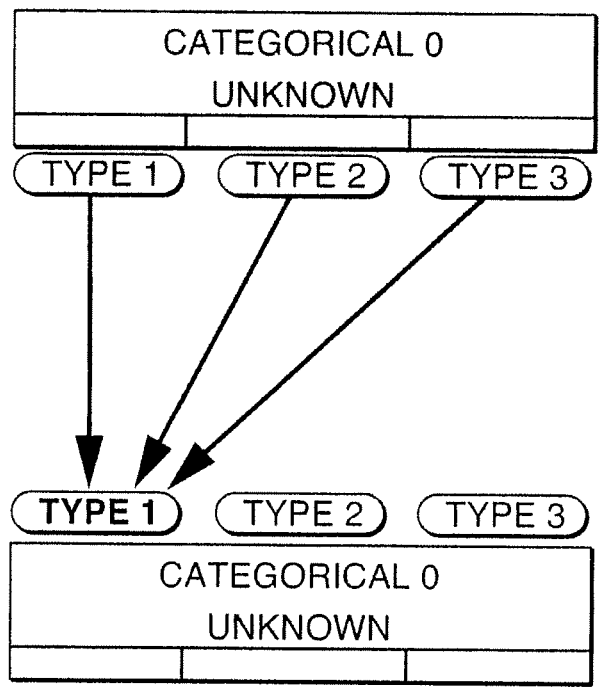
FIG. 11L illustrates an embodiment showing a user interface for which a better way has been developed of handling the edge that connects a Categorical node to a Categorical node.

FIG. 11L illustrates an embodiment showing a user interface for which a better way has been developed of handling the edge that connects a Categorical node to a Categorical node. Normally a plain black edge connects the two Categorical nodes. In the illustrated embodiment, multiple sub-edges appear, when the user points the mouse over that edge. Each state of both Categorical nodes also appears. Either one parent state or one child state can be selected at any time. This selected state is displayed differently from the other states. A different state can be selected by clicking on it. Only sub-edges connected to the selected state are displayed; all other sub-edges are hidden. When a different state is selected, all sub-edges connected to it are displayed and all other sub-edges are hidden. When the user points the mouse over a displayed sub-edge, the single parameter adjustment user interface is displayed to allow the user to adjust the parameter corresponding to that sub-edge. When the user moves the mouse away from the edge, the sub-edges disappear and the single black edge is displayed again.

Figure 11M:
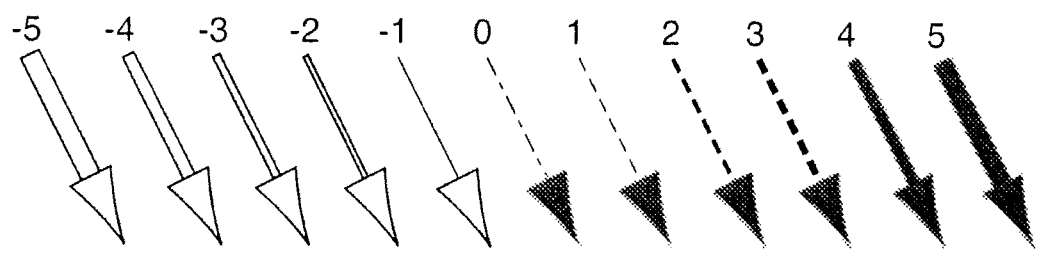
FIG. 11M illustrates an embodiment in which the hue, saturation and width values of the edge are varied to represent the underlying parameter.

FIG. 11M illustrates the use of different hue, saturation and width values of the edge to represent the underlying parameter. The illustrated user interface allows users to collapse certain structures of Boolean nodes into Categorical structures (and vice versa). In this interface, an adjustable range is provided. In FIG. 11M, the levels of link strength are shown. The link's hue, saturation, and width are adjusted to indicate its state. In other words, the edge's hue, saturation, and width are varied according to the value of its associated parameter, although hue and saturation are not visible in FIG. 11M which is not in color.

Due to this additional visualization, the user can see, at a glance, not only the relationships among the variables in the network, but also the proportional strength of those relationships. This imparts, to a degree, the sensitivity of the variables to each other, meaning that differences in sensitivities can be rapidly adjusted to match domain expert expectations.

In sum, systems and methods have been described that show how a reduced number of parameters for each parent $X_i$ can be used to populate the entire causal influence matrix for a CIM for each combination of Boolean, Ordinal, and Categorical parent and child nodes. These causal influence matrices are then used to populate an entire CPT. The number of parameters need to specify a full causal influence matrix can be reduced by exploiting the structure of and constraints on the causal influence matrix and by making reasonable assumptions about the parent-child relationship.

While certain embodiments have been described of systems and methods for computing probabilities of variables in a belief network, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited in the phrase "step for."

What is claimed is:

1. An apparatus for making a probabilistic inference based on a belief network including a child node Y and one or more parent nodes $X_i$ (i=1, . . . , n) for the child node Y, the apparatus comprising:

a processing system configured to receive as input one or more parameters of a causal influence model that describes influence of the parent nodes $X_i$ on possible states of the child node Y, and convert the parameters of the causal influence model into one or more entries of a conditional probability table, using a creation function;

wherein the child node Y and each of the parent nodes $X_i$ (i=1, . . . , n) is one of: a discrete Boolean node having states true and false; a discrete Ordinal node having a plurality of ordered states; and a discrete Categorical node having a plurality of unordered states; and wherein the influence of each of the parent nodes $X_i$ on the child node Y is one of a promoting influence and an inhibiting influence;

wherein said each one of the parent nodes $X_i$ has a promoting influence on the child node Y when a true state or a higher level state of the parent node increases the probability of the child node being in the true state or the higher level state;

wherein said each one of the parent nodes $X_i$ has an inhibiting influence on the child node Y when a false state or a lower level state of the parent node increases the probability of the child node being in the true state or the higher level state;

wherein the child node Y has a number m of states $y^k$ (k=1, . . . , m); and wherein each parent node $X_i$ (i=1, . . . , n) has a number $m_i$ of states $x_i^j$ (j=1, . . . , $m_i$);

wherein the n parent nodes $X_i$ (i=1, . . . , n) has a number $l_{max}$ of possible configurations $X_l$ (l=1, . . . , $l_{max}$), where $$l_{max} = \prod_{i=1}^{n} m_i;$$

and wherein $x_l$ represents the l-th configuration of the parent nodes $X_i$ (i=1, . . . , n) in which each parent node $X_i$ (i=1, . . . , n) is in a state $x_i^j$ (j=1, . . . , $m_i$);

wherein the probability distribution for all possible states of the child node Y comprises a set of values $P(y^k|x_l)$, where $P(y^k|x_l)$ represents the probability that the child node Y is in the state $y^k$, given that the n parents of Y are in the configuration $x_l$;

wherein the parameters of the causal influence model comprise at least one of: (i) a baseline probability $b^k$ (k=1, . . . , m) for each state $y^k$ (k=1, . . . , m) of the child node Y, wherein the baseline probability $b^k$ represents a probability that the child node Y is in the state $y^k$ when none of the parent nodes $X_i$ (i=1, . . . , n) exert any influence on the child node Y; and (ii) a causal influence $h_{ijk}$ (i=1 . . . n; j=1 . . . $m_i$; k=1 . . . m), wherein the causal influence $h_{ijk}$ represents a change in the probability of the state $y^k$ (k=1, . . . , m) of the child node Y, when the i-th parent node $X_i$ (i=1, . . . , n) is in a state $x_i^j$ (j=1, . . . , $m_i$);

wherein the creation function includes a parent influence function $V_{lk}$, and wherein the parent influence function $V_{lk}$ represents an overall influence of the parent nodes $X_i$ (i=1, . . . , n) on a probability $P(y^k|x_l)$ that the child node Y is in the state $y^k$ given that the parent nodes are in the configuration $x_l$, and wherein the creation function includes a scale factor that keeps all probabilities $P(y^k|x_l)$ between 0 and one; and wherein the parent influence function $V_{lk}$ is a function of the causal influences $h_{ijk}$; and wherein $V_{lk}$ is represented mathematically by:

$$V_{lk} = f(h_{1jk}, h_{2jk}, \ldots, h_{njk}),$$

where parent node $X_i$ takes on a state $x_i^j$ in the configuration $x_l$, where $$\sum_{k=1}^{m} V_{lk} = 0,$$

and where the value of the parent influence function $V_{lk}$ is between −1 and 1.

2. The apparatus of claim 1, wherein the creation function that converts the parameters of the causal influence model is given by:

$$P(y^k|x_l) = \begin{cases} b_k + sb^+(V_{lk}) & V_{lk} \geq 0 \\ b_k - sb^-(V_{lk}) & V_{lk} < 0, \end{cases}$$

wherein $b^+$ represents the maximum amount that the baseline probabilities $b^k$ (k=1, . . . , m) can be increased, and is represented mathematically by:

$$b^+ = 1 - \sum_{\substack{k=1 \\ V_{lk} \geq 0}}^{m} b_k;$$

wherein $b^-$ represents the maximum amount that the baseline probabilities $b^k$ (k=1, . . . , m) can be increased, and is represented mathematically by:

$$b^- = \sum_{\substack{k=1 \\ V_{lk} < 0}}^{m} b_k;$$

and wherein s is the scale factor, and is represented mathematically by:

$$s = \min(\min_{k}(s_k), 1),$$

$$\text{where } s_k = \begin{cases} \dfrac{b_k}{b^+} & V_{lk} \geq 0 \\ \dfrac{b_k}{|b^- V_{lk}|} & V_{lk} < 0. \end{cases}$$

* * * * *